United States Patent
Sagasaki et al.

(10) Patent No.: US 6,404,160 B2
(45) Date of Patent: Jun. 11, 2002

(54) NUMERICAL CONTROL APPARATUS

(75) Inventors: Masakazu Sagasaki, Nagoya; Yoshinori Yamada, Tokyo, both of (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/879,240

(22) Filed: Jun. 6, 2001

Related U.S. Application Data

(63) Continuation of application No. PCT/JP98/05868, filed on Dec. 24, 1998.

(51) Int. Cl.[7] .............................................. G05B 19/29
(52) U.S. Cl. ........................ 318/600; 318/560; 318/690
(58) Field of Search ...................... 318/30–89, 560–696; 364/474.11–474.35; 82/1.11

(56) References Cited

U.S. PATENT DOCUMENTS

| | | | | |
|---|---|---|---|---|
| 4,629,956 A | * | 12/1986 | Nozawa et al. | ............. 318/625 |
| 4,862,380 A | * | 8/1989 | Kawamura et al. | .... 364/474.11 |
| 4,988,937 A | * | 1/1991 | Yoneda et al. | ............... 318/675 |
| 5,083,066 A | * | 1/1992 | Kohari et al. | .................. 317/41 |
| 5,091,860 A | * | 2/1992 | Fujimoto | ............... 364/474.11 |
| 5,175,680 A | * | 12/1992 | Yoneda et al. | ............... 364/176 |
| 5,181,178 A | * | 1/1993 | Sasaki et al. | .......... 364/474.11 |
| 5,181,441 A | * | 1/1993 | Okada | .......................... 82/1.11 |
| 5,212,648 A | * | 5/1993 | Sugita et al. | ........... 364/474.35 |
| 5,260,879 A | * | 11/1993 | Sasaki et al. | .......... 364/474.35 |
| 5,267,142 A | * | 11/1993 | Kono et al. | ................... 364/166 |
| 5,319,288 A | * | 6/1994 | Kono et al. | ..................... 318/66 |
| 6,155,148 A | * | 12/2000 | Shinozaki et al. | ............ 82/1.11 |

FOREIGN PATENT DOCUMENTS

| | | | |
|---|---|---|---|
| JP | HEI 1-228752 | | 9/1989 |
| JP | 2-220103 | * | 9/1990 |
| JP | HEI 3-108010 | | 5/1991 |
| JP | 3-121748 | * | 5/1991 |
| JP | HEI 3-252704 | | 11/1991 |
| JP | HEI 3-273402 | | 12/1991 |
| JP | 4-21388 | * | 1/1992 |
| JP | HEI 4-65701 | | 3/1992 |
| JP | HEI 4-238504 | | 8/1992 |
| JP | HEI 5-204420 | | 8/1993 |
| JP | A 5-204420 | | 8/1993 |
| JP | 6-703 | * | 1/1994 |
| JP | HEI 7-36512 | | 2/1995 |
| JP | HEI 7-72911 | | 3/1995 |
| JP | HEI 7-319519 | | 12/1995 |
| JP | A 8-112737 | | 5/1996 |
| JP | HEI 8-32014 | | 12/1996 |
| JP | HEI 9-34520 | | 2/1997 |
| JP | A 9-73308 | | 3/1997 |
| JP | HEI 10-78810 | | 3/1998 |
| JP | A 10-174479 | | 6/1998 |
| JP | HEI 10-232705 | | 9/1998 |
| WO | WO99-01252 | | 1/1999 |

* cited by examiner

Primary Examiner—Robert E. Nappi
Assistant Examiner—Rita Leykin
(74) Attorney, Agent, or Firm—Sughrue Mion, PLLC

(57) ABSTRACT

In a numerical control apparatus 1, a synchronous control management unit 11 manages the dominant relation of plural axes to be controlled synchronously. In case of the position control system, in the axis control unit which controls the reference axis, a synchronous position calculation processing unit 74 calculates the command position to the reference axis. On the other hand, in the axis control unit which control the synchronous axis, the synchronous position calculation processing unit 74 calculates the moving stroke per unit time of the synchronous axis, thereby calculating the command position to the synchronous axis. One axis control unit which controls the reference axis and plural axis control units for controlling the synchronous axes issue the calculated command positions, and control the individual corresponding motors, and therefore control plural axes synchronously to one reference axis, and further control other axis synchronously by reference to the corresponding synchronous axis.

10 Claims, 13 Drawing Sheets

FIG.3

SYNCHRONOUS CONTROL MANAGEMENT MATRIX

|  |  | REFERENCE AXIS | | | | | |
|---|---|---|---|---|---|---|---|
|  |  | S1 | S2 | S3 | S4 | S5 | S6 |
| SYNCHRONOUS AXIS | S1 |  |  |  |  |  |  |
|  | S2 | ○ |  |  |  |  |  |
|  | S3 | ○ |  |  |  |  |  |
|  | S4 |  |  |  |  |  |  |
|  | S5 |  |  |  |  |  |  |
|  | S6 |  |  |  |  |  |  |

FIG.8
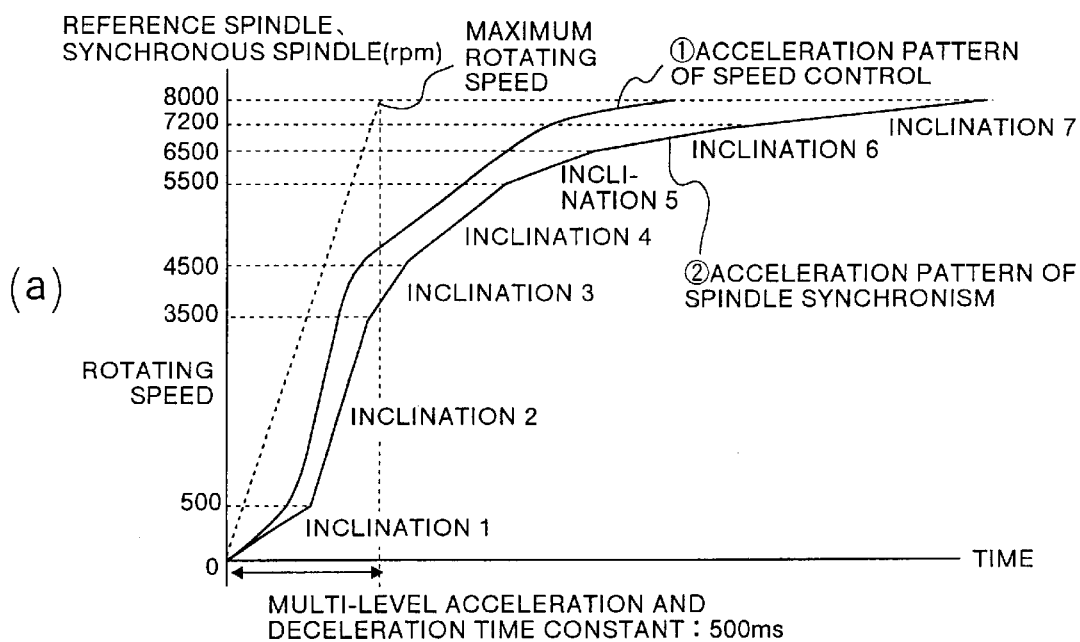
(a)
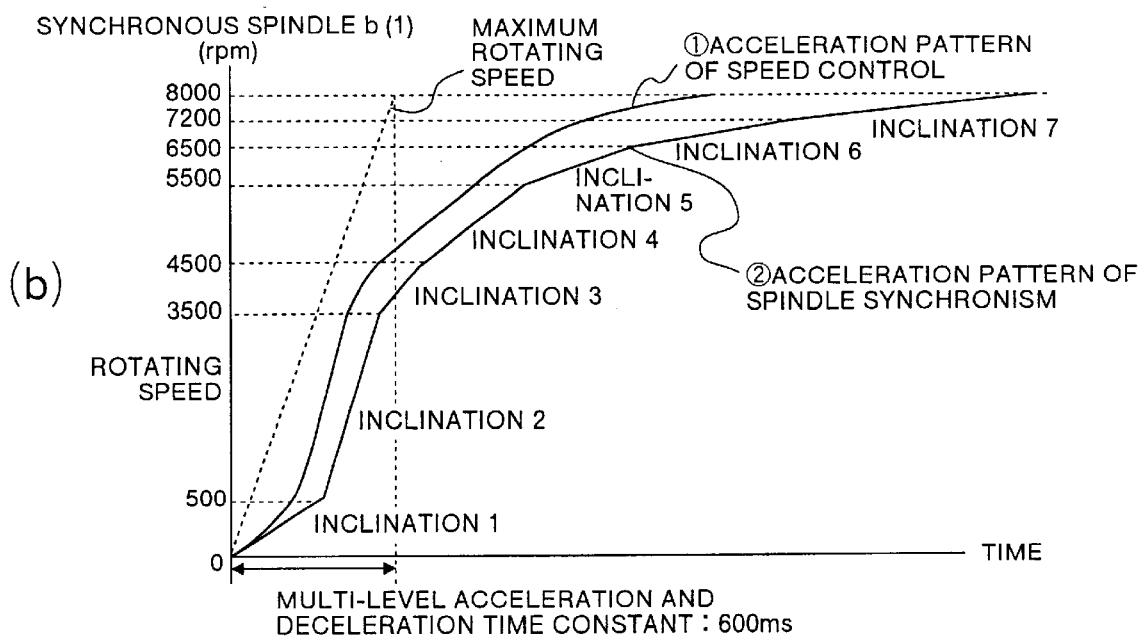
(b)

FIG.8
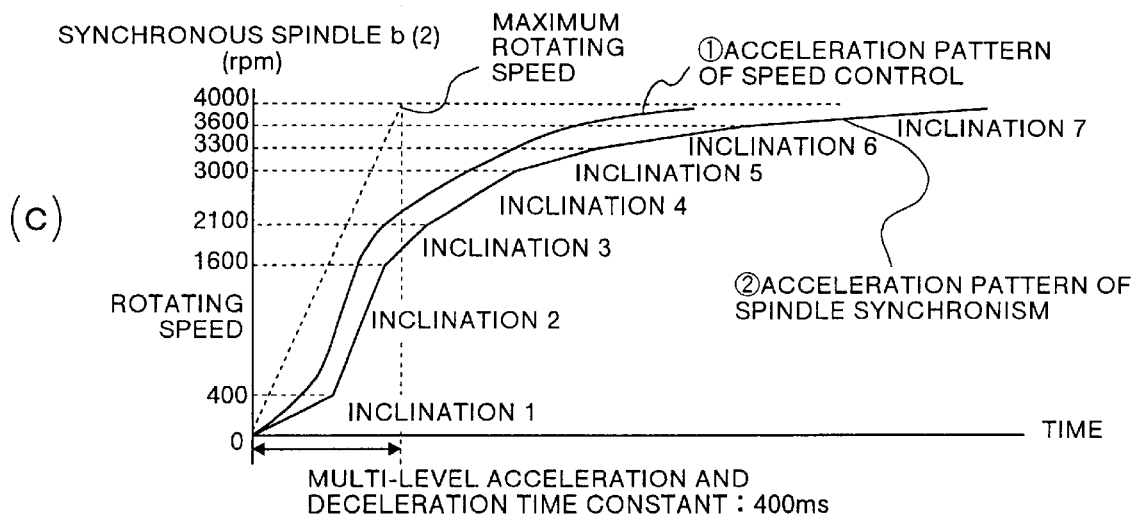
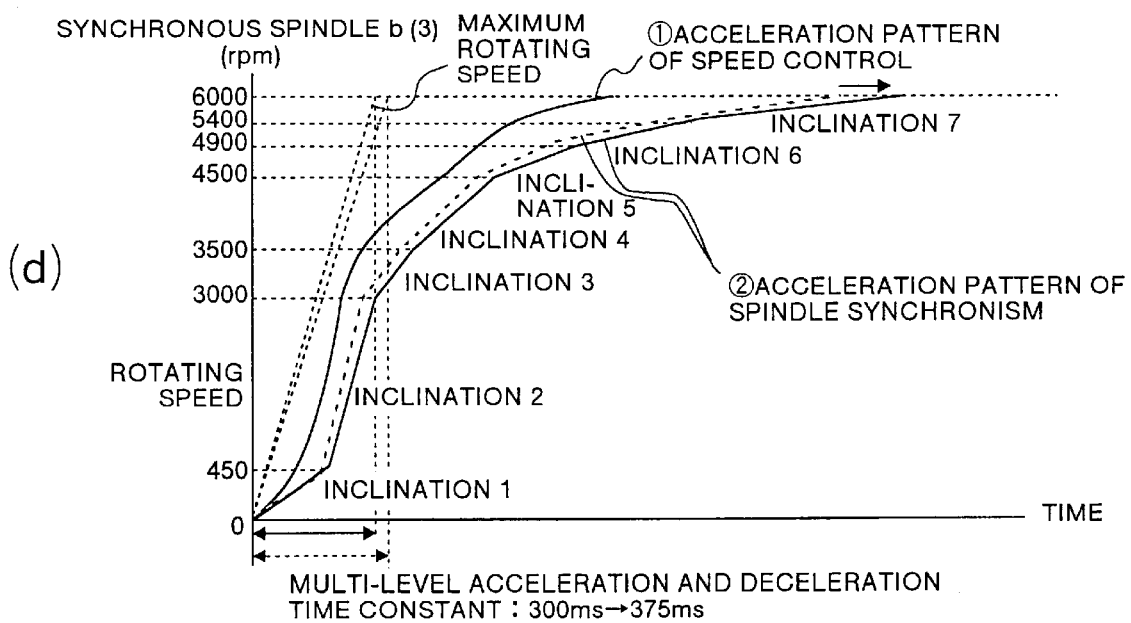

FIG.10

| MULTI-LEVEL ACCELERATION AND DECELERATION SETTING PARAMETER | REFERENCE SPINDLE, SYNCHRONOUS SPINDLE | SYNCHRONOUS SPINDLE b(1) | SYNCHRONOUS SPINDLE b(2) | SYNCHRONOUS SPINDLE b(3) |
|---|---|---|---|---|
| MULTI-LEVEL ACCELERATION AND DECELERATION TIME CONSTANT (ms) | 500 | 600 | 400 | 300 |
| MULTI-LEVEL ACCELERATION AND DECELERATION SPEED 1 (rpm) | 500 | 500 | 400 | 450 |
| MULTI-LEVEL ACCELERATION AND DECELERATION SPEED 2 (rpm) | 3500 | 3500 | 1600 | 3000 |
| MULTI-LEVEL ACCELERATION AND DECELERATION SPEED 3 (rpm) | 4500 | 4500 | 2100 | 3500 |
| MULTI-LEVEL ACCELERATION AND DECELERATION SPEED 4 (rpm) | 5500 | 5500 | 3000 | 4500 |
| MULTI-LEVEL ACCELERATION AND DECELERATION SPEED 5 (rpm) | 6500 | 6500 | 3300 | 4900 |
| MULTI-LEVEL ACCELERATION AND DECELERATION SPEED 6 (rpm) | 7200 | 7200 | 3600 | 5400 |
| MULTI-LEVEL ACCELERATION AND DECELERATION SPEED 7 (rpm) | 8000 | 8000 | 4000 | 6000 |
| MULTI-LEVEL ACCELERATION AND DECELERATION TIME CONSTANT MULTIPLYING FACTOR 1 | 7.0 | 7.0 | 6.9 | 6.8 |
| MULTI-LEVEL ACCELERATION AND DECELERATION TIME CONSTANT MULTIPLYING FACTOR 2 | 1.0 | 1.0 | 1.0 | 1.0 |
| MULTI-LEVEL ACCELERATION AND DECELERATION TIME CONSTANT MULTIPLYING FACTOR 3 | 4.8 | 4.9 | 4.7 | 4.6 |
| MULTI-LEVEL ACCELERATION AND DECELERATION TIME CONSTANT MULTIPLYING FACTOR 4 | 5.2 | 5.3 | 5.0 | 5.0 |
| MULTI-LEVEL ACCELERATION AND DECELERATION TIME CONSTANT MULTIPLYING FACTOR 5 | 7.3 | 7.4 | 7.3 | 7.1 |
| MULTI-LEVEL ACCELERATION AND DECELERATION TIME CONSTANT MULTIPLYING FACTOR 6 | 7.7 | 7.8 | 7.7 | 7.5 |
| MULTI-LEVEL ACCELERATION AND DECELERATION TIME CONSTANT MULTIPLYING FACTOR 7 | 15.2 | 15.4 | 15.2 | 15.0 |
| | (a) | (b) | (c) | (d) |

NUMERICAL CONTROL APPARATUS

This is a continuation application of PCT Patent Application PCT/JP98/05868, filed Dec. 24, 1998, which was published in Japanese.

TECHNICAL FIELD

The present invention in general relates to a numerical control apparatus for synchronous control of two or more spindle motors or servo motors driven in a machine tool. More particularly, this invention relates to a numerical control apparatus capable of realizing synchronous control of higher precision.

BACKGROUND ART

Some of the machine tools are hitherto capable of executing synchronous control of two or more spindle motors or servo motors to be driven. For example, the numerical control apparatus executes the processing program commanded from a paper tape or the like, that is, executes the numerical control process written in the processing program, and the spindle motors or servo motors of the machine tool are driven to process the work as commanded.

FIG. 12 is an essential block diagram showing an outline of a conventional numerical control apparatus for driving spindle motors or servo motors of a machine tool.

As shown in FIG. 12, the conventional machine tool comprises a numerical control apparatus 101 for synchronously controlling a motor for driving a reference axis of a lathe and a motor for driving the synchronous axis, a processing program 102 in which a program for numerical control processing is written, the reference axis including a spindle amplifier 120, a spindle motor 121, a gear 122, a reference spindle 123, and an encoder 124, and the synchronous axis including a spindle amplifier 140, a spindle motor 141, a gear 142, a synchronous spindle 143, and an encoder 144, and the rotating speed of two spindles is synchronously controlled by the numerical control apparatus 101, and further by closing chucks 125 and 145, a work 200 is held between the reference spindle 123 and synchronous spindle 143.

On the reference axis and synchronous axis, the spindle amplifiers 120 and 140 are installed between the numerical control apparatus 101 and spindle motor 121, and between the numerical control apparatus 101 and spindle motor 121, respectively, and the spindle amplifiers drive the corresponding spindle motors 121 and 141. The reference spindle 123 and synchronous spindle 143 installed by way of the gears 122 and 142 are controlled according to the feedback position from the corresponding encoders 124 and 144. The numerical control apparatus 101 comprises, as shown in the drawing, an analysis processing unit 103 for analyzing the information about the reference axis and synchronous axis, an interpolation processing unit 104 for issuing the interpolation position command or rotating speed command analyzed in the analysis processing unit 103 to subsequent circuits, a PLC circuit 105 for issuing a specified signal, a machine control signal processing unit 106 for processing the specified signal, a memory 107 for storing a processing program 102, a parameter setting unit 108 for setting parameters, a screen display unit 109 for displaying the information in the memory 107 on a screen, axis control units 110a, 110b, 110c, . . . for issuing the information about the reference axis and synchronous axis, interpolation position command, and rotating speed command to the subsequent circuits depending on the spindle to be driven, a reference axis control unit 111 which controls the reference axis on the basis of the received information, a synchronous axis control unit 112 which control the synchronous axis on the basis of the received information, and a data input/output circuit 113 for issuing various information to the reference axis and synchronous axis.

The conventional numerical control apparatus will now be explained in detail. Herein, in the spindle motor 121 for driving the reference spindle 123 and the spindle motor 141 for driving the synchronous spindle 143, the spindle synchronous control is explained.

In FIG. 12, for example, the processing program 102 being read in from a tape reader is read out and stored in the memory 107. Since the spindle synchronous control is a control executed by the spindle synchronous command code, the spindle synchronous command coded described in the processing program 102 is read out into the analysis processing unit 103 in every block from the memory 107.

The spindle synchronous command code thus being read out is analyzed in the analysis processing unit 103, and the analysis processing unit 103 notices its analysis result, that is, the information about the reference axis and synchronous axis for synchronous control to the interpolation processing unit 104.

Receiving this information, the interpolation processing unit 104 notices information about the reference axis, for example, to the axis control unit 110b (see FIG. 12) assigned to the reference axis, out of the axis control units 110a, 110b, 110c, . . . , and notices information about the synchronous axis to the axis control unit 110c (see FIG. 12) assigned to the synchronous axis. Herein, the spindle synchronous control is explained, but not in case of spindle synchronous control, for example, information about rotating speed is noticed to the axis control unit 110a (see FIG. 12) not assigned to either reference axis or synchronous axis. In this case, therefore, information about rotating speed command is directly noticed to the data input/output circuit 113, and the spindle amplifier 120 receiving this rotating speed command controls the speed of the spindle motor 121 according to this command, and rotates the spindle 123.

The axis control units 110a, 110b, 110c, . . . are assigned as shown in the diagram for the sake of convenience of explanation, but each axis control unit operates similarly when assigned to the reference axis, assigned to synchronous axis, or not assigned to either.

Consequently, the axis control unit 110b notices information about the reference axis, rotating speed command and other information to the reference axis control unit 111 as shown in the diagram, whereas the axis control unit 110c notices information about the synchronous axis to the synchronous axis control unit 112. In the reference axis control unit 111, the command position of the reference axis is calculated from the received rotating speed command, and notices this command position to the data input/output circuit 113 and synchronous axis control unit 112. The synchronous axis control unit 112 calculates the command position of the synchronous axis according to the command position of the reference axis noticed from the referenced axis control unit 111 and the information about the synchronous axis is noticed to the data input/output circuit 113.

Finally, the data input/output circuit 113 notices the received position commands to the spindle amplifiers 120 and 140, and the spindle amplifier 120 having received the command position of reference axis rotates the reference spindle 123 by controlling the speed of the spindle motor 121 according to the received command position, and further the spindle amplifier 140 having received the command position of synchronous axis rotates the synchronization spindle 143 by controlling the speed of the spindle motor 141 according to the received command position. Thus, in the conventional numerical control apparatus, the synchronous axis control unit 112 controls the command position of the synchronous axis on the axis of the command position of the reference axis calculated by the reference axis control unit 111, so that spindle synchronous control is executed between one reference spindle 123 and one synchronous spindle 143.

In the conventional numerical control apparatus, however, synchronous control about two spindles in the machine tool is possible, but this control is limited within a set of reference axis and synchronous axis. It means that three or more spindles cannot be synchronously controlled at the same time.

The reason is as follows. For example, if each axis is synchronized by noticing the command position, the axes are finally converged at the specified position, but each axis of synchronous control is different in the position control gain, speed and load, and hence there is a position deviation amount, and the precision of synchronism is lowered in an intermediate process. Accordingly, in the conventional numerical control apparatus, for example, in case of synchronous control of plural axes, one reference axis monitors fluctuations of two or more synchronous axes, and synchronous control is effected while correcting so as to decrease the position deviation amount, and therefore the control is very much complicated, and three or more spindles could not be synchronously controlled at the same time.

Accordingly, in the machine tool conventionally used, in order to perform spindle synchronous control on plural axes, it is necessary to install plural numerical control apparatuses, and the cost of the machine tool is higher. As a result, the control panel for installing the numerical control apparatuses becomes larger in size.

Further, in synchronous control of the conventional numerical control apparatus, when grabbing one work between spindles and closing the chuck, the axes may fluctuate due to disturbance or the like. Thus, in a state having a stagnant position deviation amount, when the reference axis and synchronous axis are mechanically coupled through the work, each axis moves in a direction for recovering the position deviation amount, and an abnormal torque occurs, and the work may be flawed or distorted.

It is an object of this invention to present a numerical control apparatus capable of realizing synchronous control of two or more spindles in a machine tool, realizing synchronous control of three or more spindles at the same time, and also enhancing the precision of synchronism more than in the conventional apparatus.

DISCLOSURE OF THE INVENTION

The numerical control apparatus according one aspect of this invention is for synchronously controlling a plurality of spindle motors or servo motors driven by a machine tool according to a processing program. This numerical control apparatus comprises a memory unit (corresponding to a memory 7 described in an embodiment later) which stores the processing program, a synchronous control management unit (corresponding to synchronous control management unit 11) which manages the dominant relation of plural axes to be controlled synchronously, and plural axis control units (corresponding to axis control units 10a, 10b, 10c, . . . ), having information about reference axis as the reference of synchronous control and information about synchronous axis for operating synchronously with the reference axis stores according to the dominant relation of axes managed by the synchronous control management unit, for controlling the corresponding motors on the basis of the command position calculated inside. In this construction, one axis control unit stores information about reference axis, and plural axis control units stores information about synchronous axis control the individual motors, and the plural axes can be controlled synchronously in relation to one reference axis, and also other axis can be controlled synchronously on the basis of the reference axis.

According to the above-mentioned aspect, the processing program being read out from the tape reader or the like is stored in the memory unit, and the information about the reference axis or synchronous axis, and the information about the rotating direction of synchronous axis, rotation ratio and others are analyzed inside, for example, on the basis of the spindle synchronous command described in the program, and the result is noticed to the synchronous control management unit. In the synchronous control management unit, combination of all axes for synchronous control is management, and this information is noticed to the plural axis control units, thereby setting one axis control unit which controls the reference axis, and one or plural axis control units which control the synchronous axis. Thus, the numerical control apparatus of the invention realizes synchronous control of three or more spindle motors or servo motors easily by management of the synchronous control management unit. That is, for one reference axis, plural axes (synchronous axes) can be control synchronously, and also other axis can be controlled synchronously on the basis of the synchronous axis.

Moreover, since combination of plural sets of synchronous controls can be managed, wrong combination of synchronous controls can be judged easily, and in the event of a wrong combination of synchronous controls, it is noticed to the user by alarm or the like, and the wrong combination still exists, by performing synchronous control by exchanging the reference axis and synchronous axis, synchronous control is possible in an arbitrary combination without user's consciousness about reference axis and synchronous axis.

Furthermore, in the numerical control apparatus, each one of the plural axis control units comprises an axis control system changeover unit (corresponding to an axis control system changeover unit 71 described in embodiment below) which changes over to either system of speed control system (speed control mode) for driving the corresponding motor depending on the speed command value described in the processing program or the position control system (position control mode) for driving depending on the moving stroke per unit time converted from the speed command value, an axis control command converting unit (corresponding to an axis control command converting unit 72) which calculates the moving stroke per unit time from the speed command value with respect to the reference axis, reference position input and output units (corresponding to reference position input unit 73 and reference position output unit 75) which issues the moving stroke per unit time of the reference axis calculated in the axis control command value converting unit to other axis control unit, or for receiving the moving stroke per unit time of the reference axis calculated in other axis control unit, and a synchronous position calculation processing unit (corresponding to synchronous position calculation processing unit 74) which calculates the command position corresponding to the pertinent axis, on the basis of the moving stroke calculated in the axis control command value converting unit or the moving stroke received in the reference position input unit.

Thus, in synchronous control of axis (position control system), when controlling the reference axis, the synchronous position calculation processing unit adds the moving stroke of the reference axis calculated in the axis control command converting unit to the reference position of the reference axis, and calculates the command position to the reference axis, and when controlling the synchronous axis, on the other hand, the synchronous position calculation processing unit calculates the moving stroke per unit time of the synchronous axis, from the moving stroke received in the reference position input and output unit, the gear ratio of synchronous axis to referenced axis, command rotation ratio, and command unit time ratio, and adds the moving stroke to the reference position of the synchronous axis, thereby calculating the command position to the synchronous axis. As a result, on the reference axis and synchronous axis, an accurate command position can be calculated, and the precision of synchronous control of axis can be enhanced.

Furthermore, in the numerical control apparatus, the axis control system changeover unit of the axis control unit which control the synchronous axis calculates a theoretical command position by subtracting the speed command value described in the processing program, theoretical value of position deviation amount calculated from the position control gain of the motor, and delay amount corresponding to the sampling delay time of feedback position, from the feedback position from the axis, and later changes over from the ordinary speed control system to the position control system in a contracted state of fluctuation of position deviation amount.

Thus, since changeover from the speed control system of spindle for synchronous control to position control system is executed by calculating the theoretical command position in the specified procedure (calculation by axis control system changeover unit in the axis control unit which controls the synchronous axis), and then contracting the fluctuation of the position deviation amount, the mode can be changed over to the synchronous control mode (position control system) without causing any effect on the operation of the reference axis. Therefore, since the synchronization of the axis can be controlled without causing effect on processing during processing at the reference axis side, the processing cycle can be shortened.

Furthermore, in the numerical control apparatus, each one of the plural axis control units further comprises a synchronous position correction unit (corresponding to a synchronous position correction unit 76 described in embodiment below) which corrects the fluctuation of the axis by calculating the position correction amount form the position deviation amount of reference axis and position deviation amount of synchronous axis, and adding the position correction amount to the command position of the synchronous axis.

Thus, in case of synchronization control of axis, the axis control unit which controls the reference axis calculates the command position to the reference axis, and the plural axis control units which control the synchronous axis calculate the command position to the synchronous axis on the basis of the moving stroke per unit time received from the axis control unit which controls the reference axis. The synchronous position correction unit corrects the fluctuation of the axis by adding the obtained position correction amount only to the command position of the synchronous axis. Therefore, since the axis can be controlled simultaneously without causing effect on processing during processing at the reference axis sided, the processing cycle can be shortened, and further by correcting the command position of the synchronous axis, the synchronous precision is enhanced.

Furthermore, in the numerical control apparatus, the synchronous position correction unit in the axis control unit which controls the synchronous axis multiplies the position deviation amount of reference axis by the command rotation ratio of reference axis and synchronous axis, and the command unit time ratio, and calculates the difference between the calculation result and the position deviation amount of the reference axis, then determines the value of passing the obtained difference through the primary delay filter according to a specific time constant determined by the parameter as the position correction amount.

Thus, since the deviation occurring during synchronous control is corrected by passing the difference between the calculation result and position deviation amount of reference axis through the primary delay filter, abrupt changes of command position by correction do not occur, and occurrence of useless alarm can be avoided.

Furthermore, in the numerical control apparatus, each one of the plural axis control units comprises a theoretical position deviation amount calculation processing unit (corresponding to an theoretical position deviation amount calculation processing unit 77 described in embodiment below) which calculates the theoretical position deviation amount from the speed control value described in the processing program and the position control gain of the motor, and the synchronization position correction unit, in the axis control unit which control the synchronous axis, calculates the difference between the theoretical position deviation amount of the reference axis calculated in the theoretical position deviation amount calculation processing unit and the actual position deviation amount obtained from the reference axis, and determines the value calculated from the difference, the command rotation ratio of the synchronous axis to the reference axis, and the command unit time ratio, as the position correction amount.

Thus, since the synchronous position correction unit of the axis control unit which control the synchronous axis corrects the deviation portion occurring in synchronous control by using the actual delay amount to the theoretical position deviation amount of the reference axis as the position correction amount, synchronism deviation portion due to delay caused by cutting load or the like can be easily corrected, and moreover since the position control gain and load are different, even in case of synchronous control between axes always having a difference in position deviation amount, synchronous control of high precision can be realized without causing improper torque by correction. As a result, flaw or torsion of work can be prevented, so that processing of higher precision is possible.

Furthermore, in the numerical control apparatus, each one of the plural axis control units comprises a synchronous correction amount fixing unit (corresponding to a synchronous correction amount fixing unit 78 described in embodiment below) which calculates the average of the position deviation amount in steady rotation on the reference axis and synchronous axis for synchronous control, and further calculates their difference, and the synchronous position correction unit determines, in the axis control unit which control the synchronous axis, the difference calculated in the synchronous correction amount fixing unit as the position correction amount.

Thus, since the synchronous position correction amount of the axis control unit which control the synchronous axis corrects the deviation portion occurring during synchronous control by using the difference of the average values of position deviation amount on the reference axis and synchronous axis for synchronous control as the position correction amount, the position correction amount is a fixed value, so that the load by calculation of the position correction amount can be lessened.

Furthermore, in the numerical control apparatus, the memory incorporates a synchronous correction coefficient holding unit (corresponding to a synchronous correction coefficient holding unit 51 described in embodiment below) which calculates the average of the position deviation amount in steady rotation on the reference axis and synchronous axis for synchronous control, at the time of initial adjustment of the machine tool, and holds the value obtained by dividing this average by the speed control value as the coefficient for obtaining the position deviation amount, and the synchronous position correction unit calculates, in the axis control unit which control the synchronous axis, the average of the position deviation amount in steady rotation on the reference axis and synchronous axis for synchronous control, by applying the speed command value by the coefficient held in the synchronous correction coefficient holding unit, and obtains this difference as the position correction amount.

Thus, the synchronous position correction unit of the axis control unit which control the synchronous axis calculates the average of the position deviation amount on the reference axis and synchronous axis for synchronous cl control, and the value obtained by dividing this average by the speed command value is held in the synchronous correction coefficient holding unit as the coefficient for obtaining the position deviation amount. This held value is a constant for obtaining the position deviation amount not depending on the speed command value, and therefore if the speed command value is different from the time of initial adjustment in synchronous control, the position deviation amount in steady rotation can be easily calculated by multiplying the coefficient by the speed command value.

The numerical control apparatus may preferably further comprise a synchronous correction amount error canceling unit (corresponding to a synchronous correction amount error canceling unit 79 described in embodiment below) which cancels the variation component of position deviation amount caused by variation due to disturbance or the like, by subtracting the difference between the average of the position deviation amount in steady rotation on the axis for synchronous control and the actual position deviation amount, temporarily from the position correction amount.

Thus, when grabbing the work in a state changed in the position deviation amount of the axis, the difference between the average of the position deviation amount in steady rotation on the synchronous axis for synchronous control and the actual position deviation amount calculated preliminarily is subtracted temporarily from the position correction amount applied on the synchronous axis. As a result, variation component of the position deviation amount caused by variation due to disturbance or the like can be canceled, and synchronous control is realized at an optimum position deviation amount.

The numerical control apparatus may preferably further comprise a multi-level acceleration and deceleration parameter memory unit (corresponding to a multi-level acceleration and deceleration parameter memory unit 81 described in embodiment below) which stores the multi-level acceleration an deceleration speed generated by the acceleration and deceleration pattern of ordinary speed control system, multi-level reference acceleration and deceleration time constant, and multi-level acceleration and deceleration time constant multiplying factor by manipulating the parameter setting screen, a reference inclination amount calculation unit (reference inclination amount calculation unit 83) which calculates the reference inclination amount, as the acceleration and deceleration speed per unit time, from the maximum rotating speed and multi-level reference acceleration and deceleration time constant of the reference spindle and synchronous spindle, a multi-level. acceleration and deceleration pattern calculation unit (multi-level acceleration and deceleration pattern calculation unit 84) which calculates an appropriate multi-level acceleration and deceleration pattern from the set multi-level acceleration and deceleration pattern, and a multi-level acceleration and deceleration decision unit (multi-level acceleration and deceleration decision unit 82) which determines the multi-level acceleration and deceleration pattern to be noticed to the synchronous control management unit.

Thus, in spindle control between two or more spindle motors, when controlling the acceleration and deceleration of spindle motors by the multi-level acceleration and deceleration pattern of the position control system, the configuration for selecting an appropriate multi-level acceleration and deceleration pattern is designated. For example, if the multi-level acceleration and deceleration pattern is different on each spindle, the multi-level acceleration and deceleration time constant is determined on the basis of the one of the largest inclination of acceleration and deceleration, and other acceleration and deceleration patterns defined by a constant multiple (1 or larger integer) of the multi-level acceleration and deceleration time constant, and therefore an appropriate multi-level acceleration and deceleration pattern can be selected and judged by a simple process of comparison of multi-level acceleration and deceleration time constants.

For example, similarly, since an appropriate multi-level acceleration and deceleration pattern is calculated from the ratio of the multi-level acceleration and deceleration time constants between spindles different in the multi-level acceleration and deceleration pattern, if it is necessary to select the one of the large inclination of acceleration and deceleration, it can be easily corrected to an appropriate multi-level acceleration and deceleration pattern.

BRIEF DESCRIPTION OF THE DRAWINGS

FIG. 3 shows a synchronous control management matrix for management of a set of synchronous control;

FIG. 8 shows a specific example of multi-level acceleration and deceleration pattern for synchronous control;

FIG. 10 shows an example of setting of multi-level acceleration and deceleration pattern for synchronous control;

BEST MODE FOR CARRYING OUT THE INVENTION

The invention is more specifically described below while referring to the accompanying drawings. It must be noted, however, that the invention is not limited to the illustrated embodiments alone.

Figure 1:
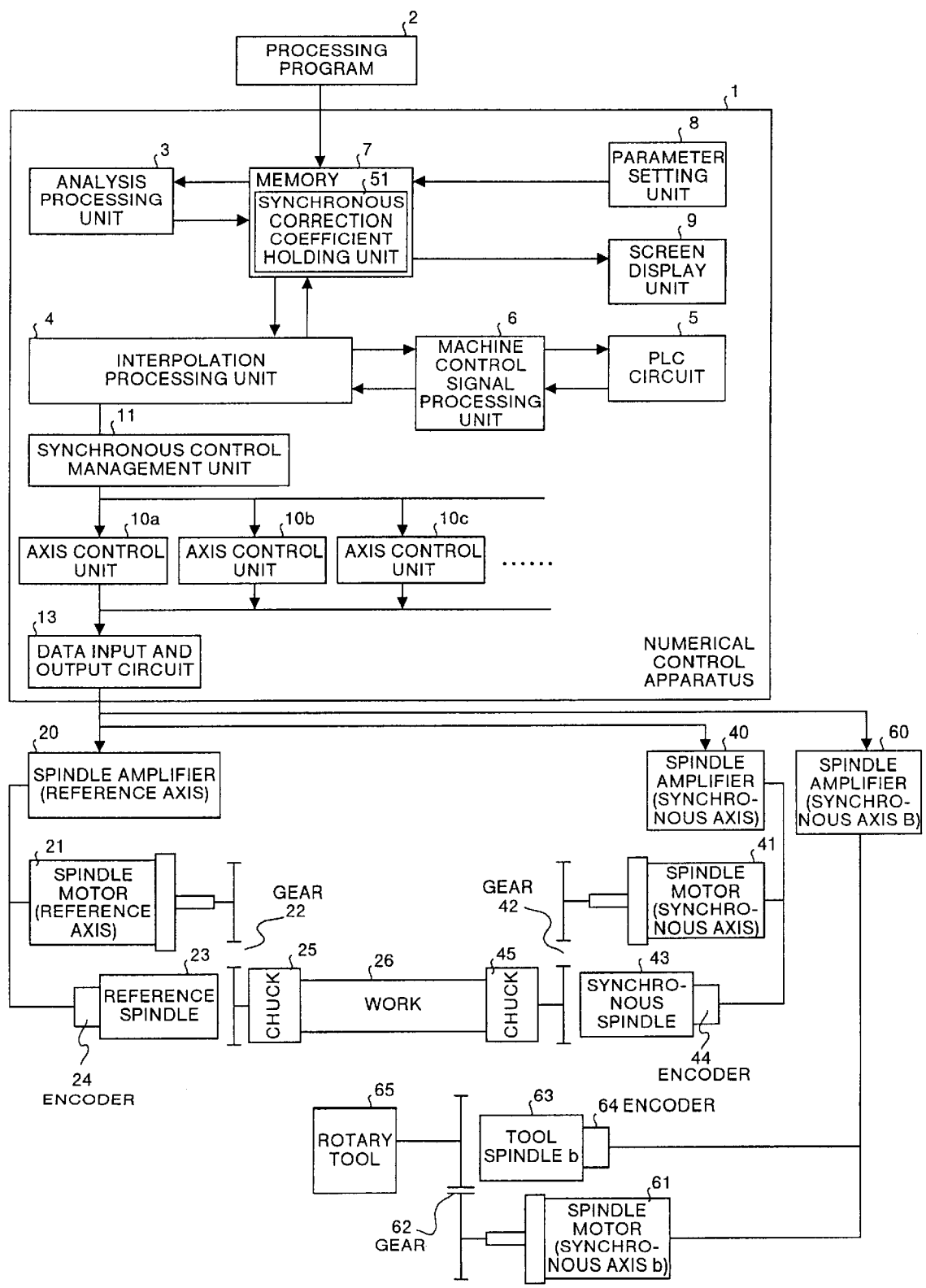
FIG. 1 shows a configuration of a numerical control apparatus according to a first embodiment.

FIG. 1 is an essential block diagram of the numerical control apparatus according to the first embodiment. This numerical control apparatus is capable of driving spindle motors or servo motors of a machine tool.

As shown in FIG. 1, the machine tool of the invention comprises a numerical control apparatus 1 for synchronously controlling a motor for driving a reference axis and a motor for driving a synchronous axis, a processing program 2 storing a program for numerical control process, a reference axis including a spindle amplifier 20, a spindle motor 21, a gear 22, a reference spindle 23, and an encoder 24, a first synchronous axis including a spindle amplifier 40, a spindle motor 41, a gear 42, a synchronous spindle 43, and an encoder 44, and a second synchronous axis including a spindle amplifier 60, a spindle motor 61, a gear 62, a synchronous spindle 63, and an encoder 64, in which the rotating speed of the three spindles is synchronously controlled by the numerical control apparatus 1, and a work 26 is held between the reference spindle 23 and synchronous spindle 43 by closing chucks 25 and 45, and further a rotary tool 65 is rotated.

In the reference axis, first synchronous axis and second synchronous axis, the spindle amplifiers 20, 40, and 60 are installed respectively between the numerical control apparatus 1 and spindle motor 21, between the numerical control apparatus 1 and spindle motor 41, and between the numerical control apparatus 1 and spindle motor 61, and the spindle amplifiers are driving the corresponding spindle motors 21, 41, and 61. The reference spindle 23, synchronous spindle 43, and synchronous spindle 63 installed respectively by way of the gears 22, 42, and 62 are driven according to the feedback position from the corresponding encoders 24, 44, and 64.

The numerical control apparatus 1 comprises, as shown in the drawing, an analysis processing unit 3 for analyzing the information about the reference axis and synchronous axes, an interpolation processing unit 4 for transmitting the interpolation position command and rotating speed command analyzed in the analysis processing unit 3 to succeeding circuits, a PLC circuit 5 for issuing a specified signal, a machine control signal processing unit 6 for processing the specified signal, a memory 7 storing the processing program 2 and incorporating an synchronization correction coefficient holding unit 51 described below, a parameter setting unit 8 for setting various parameters by user's manipulation, a screen display unit 9 for displaying the information in the memory 7 on the screen, a synchronous control management unit 11 for managing the combination of spindles for synchronous control, axis control units 10a, 10b, 10c, . . . for controlling the corresponding spindles by output of information about reference axis and synchronous axes, command position, speed command, etc., and a data input and output unit 13 for sending various information to the reference axis and synchronous axes. In this embodiment, for the sake of convenience of explanation, in particular, synchronous control of three spindles is explained, but the number of spindles for synchronous control is not limited, and any plurality of spindles can be synchronously controlled by the management of the synchronous control management unit 11.

Figure 2:
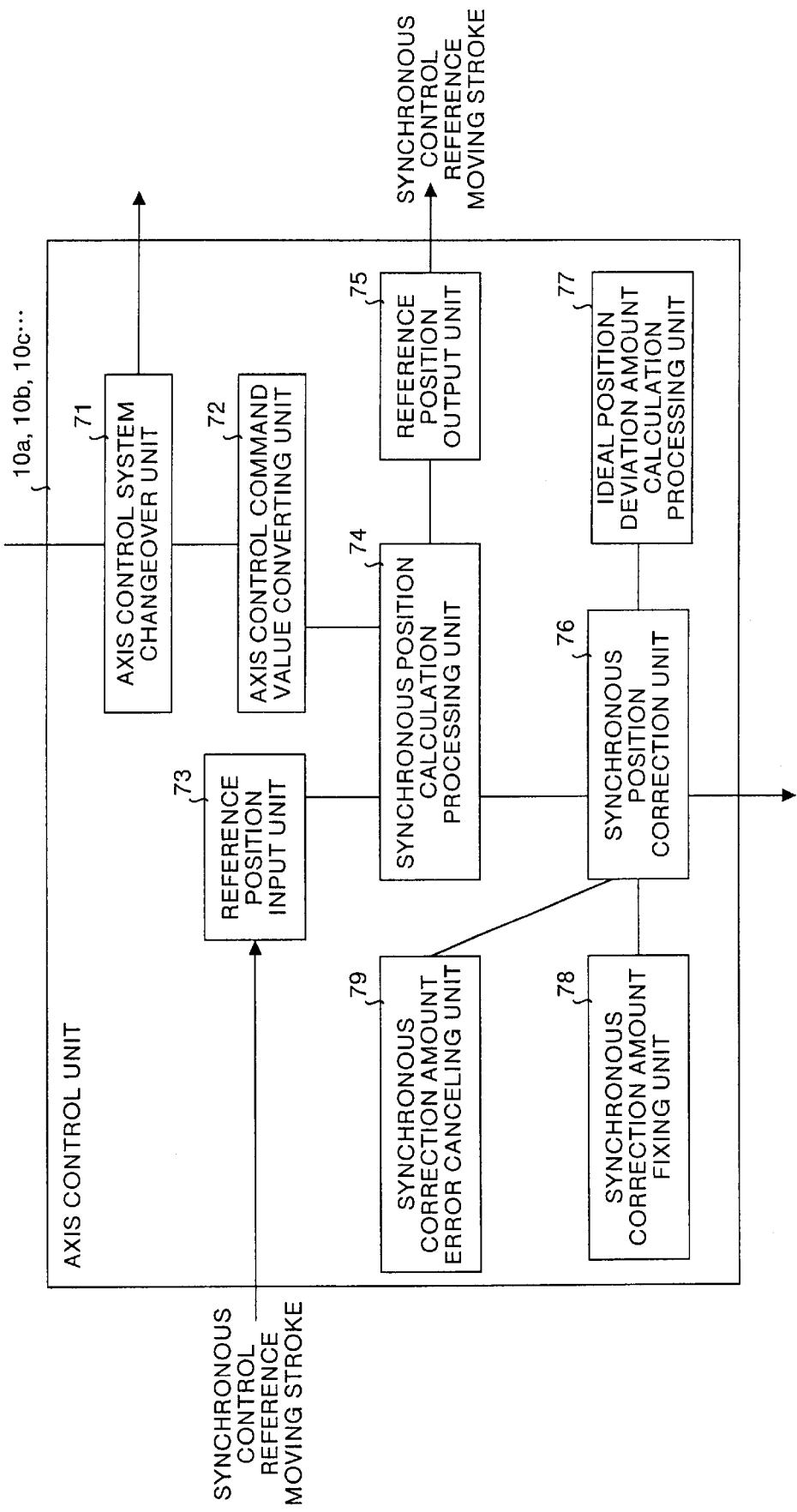
FIG. 2 shows a configuration of axis control unit in the numerical control apparatus.

FIG. 2 is an essential block diagram specifically describing the axis control units 10a, 10b, 10c, . . . in FIG. 1.

As shown in FIG. 2, each axis control unit comprises an axis control system changeover unit 71, an axis control command value converting unit 72, a reference position input unit 73, a synchronous position calculation processing unit 74, a reference position output unit 75, a synchronous position correction unit 76, ah theoretical position deviation amount calculation processing unit 77, a synchronous correction amount fixing unit 78, and a synchronous correction amount error temporary canceling unit 79. Each axis control unit can control either reference axis or synchronous axis by the management of the synchronous control management unit 11.

The axis control system changeover unit 71 changes over the corresponding motor in either speed control system (speed control mode: control in ordinary state) for driving according to the command speed described in the processing program, or position control system (position control mode: synchronous control) for driving according to the moving stroke per unit time converted from the corresponding speed command value. The axis control command value converting unit 72 calculates the moving stroke per unit time from the command speed to the reference axis. The reference position input unit 73 receives the moving stroke per unit time of the reference axis calculated in other axis control unit. The synchronous position calculation processing unit 74 calculates the command position to the corresponding axis on the basis of the moving stroke calculated in the axis control command value converting unit 72 or the moving stroke received in the reference position input unit 73. The reference position output unit 75 issues the moving stroke per unit time of the reference axis calculated in the axis control value converting unit 72 to other axis control unit. The synchronous position correction unit 76 calculates the position correction amount from the position deviation amount of the reference axis and position deviation amount of synchronous axis, and corrects variation of axis by adding the position correction amount to the command position of the synchronous axis. The theoretical position deviation amount calculation processing unit 77 calculates an ideal position deviation amount from the speed command value described in the processing program and the position control gain of the motor. The synchronous correction amount fixing unit 78 calculates the average of position deviation amount in steady rotation on the reference axis and synchronous axis for synchronous control, further calculates the difference thereof, and determines the result of calculation as the fixed position correction amount. The synchronous correction amount error temporary canceling unit 79 subtracts the difference of the average of position deviation amount in steady rotation on the reference axis and synchronous axis for synchronous control and the actual position deviation amount, temporarily from the position correction amount, and cancels the variation component of position deviation amount caused by variation due to disturbance or the like.

The operation of the numerical control apparatus will be explained below.

First, by the spindle synchronous command described in the processing program 2, synchronous control of three spindles is explained, assuming to control the spindle 23 as reference spindle and spindle 43 as synchronous spindle, and further to control the spindle 23 as reference spindle and spindle 43 as synchronous spindle. In FIG. 1, the axis control unit 10*a* controls the spindle 23 through the spindle amplifier 20, the axis control unit 10*b* controls the spindle 43 through the spindle amplifier 40, and the axis control unit 10*c* controls the spindle 63 through the spindle amplifier 60.

The processing program 2 being read out, for example, from a tape reader is stored in the memory 7, and when executing the processing program 2, the analysis processing unit 3 reads out the processing program 2 block by block from the memory 7, and analyzes the described spindle synchronous command. This spindle synchronous command is analyzed by the analysis processing unit 3 as information about reference axis and synchronous axes, rotating direction and rotation ratio of synchronous axes, and noticed to the interpolation processing unit 4. In the interpolation processing unit 4, these items of information are noticed to the synchronous control management unit 11.

In the synchronous control management unit 11, combination of commanded synchronous control axes is managed, and the information about the reference axis is noticed to the axis control unit 10*a* responsible for control of reference axis, out of axis control units 10*a*, 10*b*, 10*c*, . . . , or the information about synchronous axes, and information of rotating direction and rotation ratio of synchronous axes 43 and 63 to the reference axis 23 are noticed to the axis control units 10*b*, 10*c* responsible for control of synchronous axes. Moreover, the reference position output unit 75 of the axis control unit 10*a* and the reference position input unit 73 of the axis control units 10*b*, 10*c* are connected with each other, so that the synchronous control reference moving stroke of the reference axis mentioned below may be noticed to the synchronous axes.

Herein, the management method of combination of synchronous control in the synchronous control management unit 11 is explained according to the synchronous control management matrix shown in FIG. 3.

In the case of synchronous control in combination of a plurality of axes, all combinations are managed in the synchronous control management unit 11, and it is required to perform synchronous control according to the dominant relation thereof. In the example shown in FIG. 3, spindle S1 is the reference spindle, and spindle S2 is synchronously controlled, and further spindle S1 is the reference spindle, and spindle S3 is synchronously controlled. By managing to control sequentially from the axis other than the synchronous axis, a plurality of spindles are controlled synchronously.

Further, by using the synchronous control management matrix, unjust synchronous control pattern is checked. For example, in principle, it is not allowed to combine one synchronous axis with plural reference axes, and therefore if it is attempted to control spindle S4 as reference axis and spindle S1 simultaneously during synchronous control of spindle S2 with spindle S1 as reference axis, in the synchronous control management unit 11, since spindle S2 is already controlled synchronously with spindle S1 as reference axis, synchronous control with spindle S4 as reference axis is disabled. Therefore, such command is judged to be synchronous control command of unjust combination. The synchronous control management unit 11 develops such matrix on the memory, and realizes a similar management.

By such management of the synchronous control management unit 11, the following operation is carried out in the axis control units 10*a*, 10*b*, 10*c* receiving such information.

The axis control system changeover unit 71 calculates a theoretical value of position deviation amount from the command speed described in the processing program and the position control gain of the axis, and further calculates the moving stroke corresponding to the sampling delay time of the feedback position from this command speed, and subtracts these calculation results from the feedback position from the spindle amplifier, and thereby calculates the command position. In a contracted state of variation of this position deviation amount, in order to change over the effective command from the speed command value to the position command value, checking for waiting time determined by the attained speed or parameter, consequently, the control system to the spindle is changed over from the ordinary speed control system to the position control system of synchronous control.

In the axis control unit 10*a* of the reference axis change over to the position control system, the axis control command value converting unit 72 converts the speed command to the reference spindle 23 to the moving stroke per unit time, and notices this moving stroke to the synchronous position calculation processing unit 74 as the synchronous control reference moving stroke. Further, the synchronous position calculation processing unit 74 issues the synchronous control reference moving stroke to the axis control units 10*b*, 10*c* responsible for control of synchronous axes by way of the reference position output unit 75.

In this state, the synchronous position calculation processing unit 74 adds the synchronous control reference moving stroke to the synchronous control reference position, and issues the result of addition to the synchronous position correction unit 76 as a new synchronous control reference position. In the synchronous position correction unit 76, in order to control the reference axis, the received synchronous control reference position is used as the command value, and the command position is noticed to the spindle amplifier 20 by way of the data input and output circuit 13.

On the other hand, in the axis control units 10*b*, 10*c* of synchronous axes changed over to the position control system, the following operation is carried out.

First, in the synchronous axis 43 synchronized with the reference axis 23, the reference position input unit 73 of the axis control unit 10*b* receives the synchronous control reference moving stroke issued from the reference position output unit 75 of the axis control unit 10*a* for controlling the reference axis 23 related by the synchronous control management unit 11, and notices to the synchronous position calculation processing unit 74.

The synchronous position calculation processing unit 74 multiplies the received synchronous control reference moving stroke by the gear ratio of the synchronous axis 43 to the reference axis 23, command rotation ratio, and command unit ratio, and determines the product as the synchronous control reference moving stroke to the synchronous axis 43. In the axis control unit 10*b*, since there is no other axis for synchronous control with synchronous axis 43 as reference axis, the synchronous control reference moving stroke is not issued to other axis control unit.

Afterwards, in the synchronous position calculation processing unit 74, this synchronous control reference moving stroke is added to the synchronous control reference position, and the result of addition is noticed to the synchronous position correction unit 76 as a new synchronous control reference position. Consequently, the synchronous position correction unit 76 calculates the position correction amount in a method described below from the position deviation amount of the reference axis 23 and the position deviation amount of the synchronous axis 43, and adds it to the synchronous control reference position to obtain command position, then notices the obtained command position to the spindle amplifier 40 by way of the data input and output circuit 13. In the synchronous axis 63 synchronized with the reference axis 23, the operation of the axis control unit 10c for controlling the synchronous axis 63 is same as mentioned above.

The method of calculation of the above position correction amount is described in detail below.

In the synchronous position correction unit 76 of axis control units 10b, 10c for controlling the synchronous axes, by the spindle synchronous control described in the processing program 2, the calculation method of position correction amount is selected from the following two, and deviation component due to variation of axis is synchronously corrected.

In a first calculation method of position correction amount, the position deviation amount of reference axis is multiplied by the command unit time ratio of reference axis to synchronous axis, and command rotation ratio, the difference of this calculation result and position deviation amount of synchronous axis is calculated, and the delay amount of synchronous axis to the position of reference axis is obtained. This difference is passed through a primary delay filter according to a specific time constant determined by the parameter in the memory 7, and the position correction amount is obtained. This method is employed in the case where the difference in the load between reference axis and synchronous axis is not so much.

In a second calculation method of position correction amount, the theoretical position deviation amount calculation processing unit 77 of the axis control unit for value of position deviation amount of reference axis, from the command speed described in the processing program and the position control gain of the axis, and calculates the difference from the position deviation amount of reference axis obtained through the data input and output circuit 13. This is multiplied by the command unit ratio and command rotation ratio of synchronous axis to reference axis, and the result of calculation is obtained as the position correction amount in the synchronous axis. This method is employed when the difference is large in the load between reference axis and synchronous axis, and the difference of follow-up delay of reference axis and follow-up delay of synchronous axis is always large.

The synchronous position correction unit 76 of the axis control units 10b, 10c of synchronous axes can temporarily fix the position correction value by, for example, a specified signal from the PLC circuit 5, or cancel the error of the position correction amount.

In a method of temporarily fixing the position correction amount, first, the average of position deviation amount in steady rotation on reference axis and synchronous axis for synchronous control is detected preliminarily. Closing the chucks mutually, when the torque is transmitted to each other between axes for synchronous control through the work or the like, for example, the PLC circuit 75 issues a chuck close signal as the specified signal. This chuck close signal is noticed to the synchronous correction amount fixing unit 78 of the axis control unit of the synchronous axis through the machine control signal processing unit 76, and in the synchronous correction amount fixing part 78, at this time, the difference between the average of the position deviation amount of reference axis and average of position deviation amount of synchronous axis is noticed to the synchronous position correction unit 76 as position correction amount. The position correction value obtained in this method is the difference between the average of the position deviation amount of reference axis and average of position deviation amount of synchronous axis, and is hence a fixed value.

Meanwhile, in order to obtain the average of position deviation amount in steady rotation on reference axis and synchronous axis, at the time of initial adjustment of machine tool beforehand, the average of position deviation amount in steady rotation is detected, and divided by the command speed, and the result is held, for example, in the synchronous correction coefficient holding unit 51. At this time, the held value is the coefficient for obtaining the position deviation amount not depending on the command speed, and hence if the command speed of ordinary operation is different from the command speed of initial adjustment, by multiplying the coefficient by the command speed at this time, the position deviation amount in steady rotation can be calculated easily.

Calculating the difference of the average of position deviation amount on reference axis and synchronous axis thus calculated, together with the input of specified signal issued from the PLC circuit 5, the difference of average of position deviation amount of reference axis and synchronous axis is noticed to the synchronous position correction unit 76 as position correction amount. This method is employed when always working as synchronous axis and correcting the guide bush spindle or the like for mutually transmitting with reference axis through the work.

On the other hand, in a method of canceling the error of position correction amount, assume to grab the work in a changed state of position deviation amount of axis, due to variation caused by operation. At this time, the synchronous correction error canceling unit 79 calculates the difference between the average of position deviation amount in steady rotation on reference axis and synchronous axis calculated beforehand, and the actual position deviation amount. As the specified signal issued from the PLC circuit 5, together with the input of error cancel signal, the error is temporarily subtracted from the position correction amount applied on the synchronous axis, the variation component of position deviation amount caused by variation due to disturbance or the like is canceled, and the axes are controlled synchronously with an optimum position deviation amount.

In the operation of the numerical control apparatus 1 of the invention, by the spindle synchronous command described in the processing program 2, synchronous control of three spindles is explained, for example, supposing to control the spindle 23 as reference spindle, spindle 43 as synchronous spindle, and spindle 63 as synchronous spindle. Explanation is omitted as for the operation same as explained above.

After the same operation as explained above, the synchronous control management unit 11 manages the combination of commanded synchronous control axes, notices the information about reference axis to the axis control unit 10a for controlling the reference axis, out of axis control units 10a, 10b, 10c, . . . , and also notices the information about synchronous axes and the information about the rotating direction and rotation ratio of synchronous axes 43, 63 to the reference axis 23, to the axis control units 10b, 10c for controlling the synchronous axes. Further, connecting the reference position output unit 75 of the axis control unit 10a and reference position input unit 73 of the axis control units 10b, 10c, the synchronous control reference moving stroke of reference axis is noticed to the axis control unit 10b for controlling the synchronous axis.

Next, the information about reference axis is noticed to the axis control unit 10b, and the information about synchronous axis and the information about the rotating direction and command rotation ratio of the synchronous axis 63 to the reference axis 43 are noticed to the axis control unit 10c for controlling the synchronous axis. Further, connecting the reference position output unit 75 of the axis control unit 10b and reference position input unit 73 of the axis control unit 10c, the synchronous control reference moving stroke of reference axis is noticed to the axis control unit 10c for controlling the synchronous axis.

In this state, in the axis control units 10a, 10b, and 10c for reference axis and synchronous axes, the axis control system changeover unit 71 changes over the axis control system from speed control system to position control system.

In the axis control unit 10a of reference axis changed over to the position control system, the axis control command value converting unit 72 converts the speed command to the reference spindle 23 to the moving stroke per unit time, and notices this moving stroke as the synchronous control reference moving stroke to the synchronous position calculation processing unit 74. In the synchronous position calculation processing unit 74, further, the synchronous control reference moving stroke is issued to the axis control unit 10b for controlling the synchronous axis through the reference position output unit 75.

In this state, the synchronous position calculation processing unit 74 adds the synchronous control reference moving stroke to the synchronous control reference position, and notices the result of addition as a new synchronous control reference position to the synchronous position correction unit 76. In the synchronous position correction unit 76, in order to control the reference axis, using the received synchronous control reference position as command value, the command position is noticed to the spindle amplifier 20 by way of the data input and output circuit 13.

Next, in the axis control unit 10b of reference axis changed over to the position control system, the axis control command value converting unit 72 converts the speed command to the reference spindle 43 to the moving stroke per unit time, and notices this moving stroke as the synchronous control reference moving stroke to the synchronous position calculation processing unit 74. In the synchronous position calculation processing unit 74, further, the synchronous control reference moving stroke is issued to the axis control unit 10c for controlling the synchronous axis through the reference position output unit 75.

In this state, the synchronous position calculation processing unit 74 adds the synchronous control reference moving stroke to the synchronous control reference position, and notices the result of addition as a new synchronous control reference position to the synchronous position correction unit 76. In the synchronous position correction unit 76, in order to control the reference axis, using the received synchronous control reference position as command value, the command position is noticed to the spindle amplifier 40 by way of the data input and output circuit 13.

On the other hand, in the axis control unit 10c of reference axis changed over to the position control system, the following operation is carried out.

First, in the synchronous axis 63 synchronized with the reference axis 43, the reference position input unit 73 of the axis control unit 10c receives the synchronous control reference moving stroke issued from the reference position output unit 75 of the axis control unit 10b for controlling the reference axis 43 related by the synchronous control management unit 11, and notices to the synchronous position calculation processing unit 74.

The synchronous position calculation processing unit 74 multiplies the received synchronous control reference moving stroke by the gear ratio of the synchronous axis 63 to the reference axis 43, command rotation ratio, and command unit ratio, and determines the product as the synchronous control reference moving stroke to the synchronous axis 63. In the axis control unit 10c, since there is no other axis for synchronous control with synchronous axis 63 as reference axis, the synchronous control reference moving stroke is not issued to other axis control unit.

Figure 4:
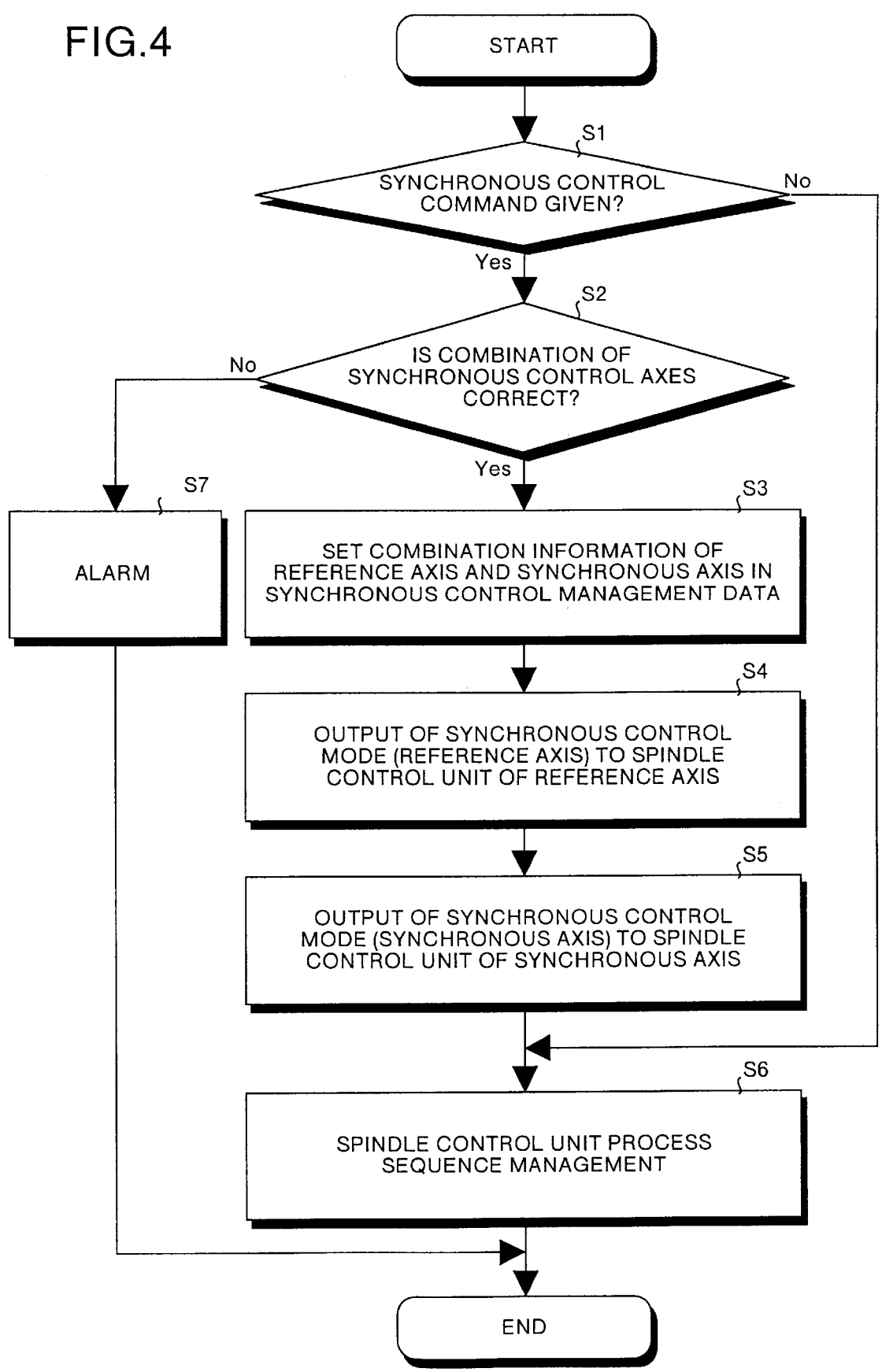
FIG. 4 is a flowchart for management of synchronous control.

Afterwards, in the synchronous position calculation processing unit 74, this synchronous control reference moving stroke is added to the synchronous control reference position, and the result of addition is noticed to the synchronous position correction unit 76 as a new synchronous control reference position. Consequently, the synchronous position correction unit 76 calculates the position correction amount from the position deviation amount of the reference axis 43 and the position deviation amount of the synchronous axis 63, and adds it to the synchronous control reference position to obtain command position, then notices the obtained command position to the spindle amplifier 60 by way of the data input and output circuit 13. FIG. 4 is a flowchart for managing the synchronous control in the numerical control apparatus of the invention.

Referring to FIG. 4, the managing method of axis for synchronous control and the managing method of processing sequence in each axis control unit are explained below.

Figure 5:
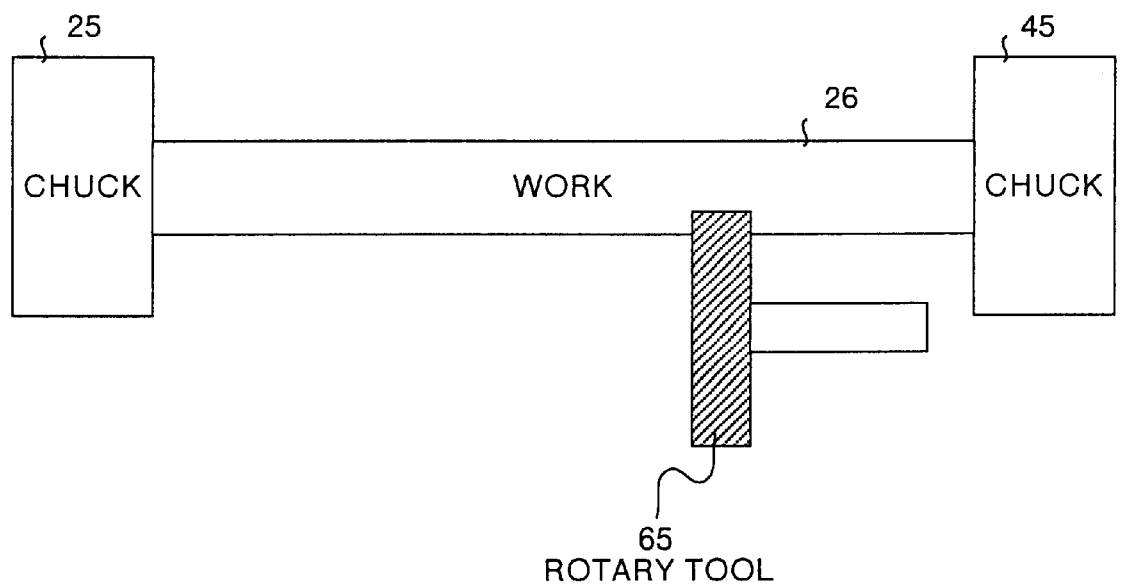
FIG. 5 shows a combination of synchronous control axes by analysis of spindle synchronous control command.

First, the processing program 2 is analyzed in the analysis processing unit 3 (FIG. 4, S1), and if the information noticed to the synchronous control management unit 11 is obtained by analyzing the spindle synchronous control command as shown in FIG. 5 (S1, Yes), referring to the data on the memory showing the synchronous control management matrix shown in FIG. 3, it is judged if the commanded command of synchronous control axes is correct or not (S2). If the information is not obtained by analyzing the spindle synchronous control command (S1, No), ordinary speed control is executed.

In judgement at step S2, if not correct, it means the axis newly commanded as synchronous axis has been already handled as synchronous axis in any combination of synchronous control. For example, if not correct (S2, No), the synchronous control management unit 11 controls to issue an alarm (S7), and if correct (S2, Yes), the information of synchronous control is newly set in the data of synchronous control management matrix (S3).

Later, the synchronous control management unit 11 notices the information about reference axis and synchronous control mode request to the axis control unit (10a, 10b, . . . etc.) for controlling the axis used as reference axis. Further, the synchronous control management unit 11 also notices the information about synchronous axis, synchronous control mode request, rotation ratio and other information to the axis control unit (10a, 10b, . . . etc.) of axis as synchronous axis (S5).

Finally, the synchronous control management unit 11 manages the sequence of processing of axis control units on the basis of the data of synchronous control management matrix (S6). The sequence of management is from the axis not handled as synchronous axis. That is, if the axis is being handled as the reference axis, the next axis handled as synchronous axis is controlled, or if this synchronous axis is also being handled as the reference axis, the second axis handled as synchronous axis is controlled sequentially. Thus, searching combinations of synchronous control in all axes, it is possible to control in the sequence from reference axis to synchronous axes.

Figure 6:
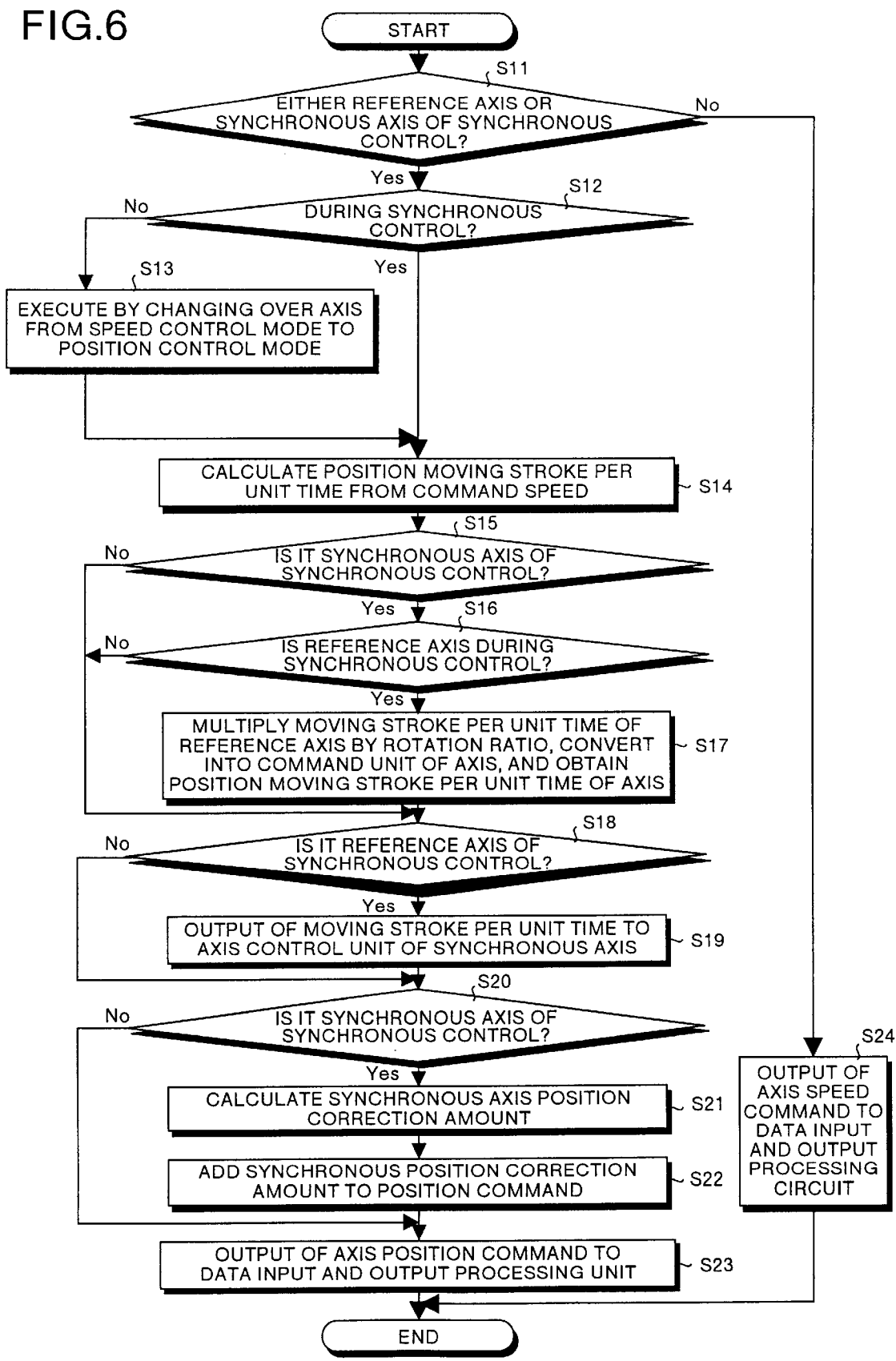
FIG. 6 is a flowchart of axis control unit.

FIG. 6 is a flowchart of the process performed by the axis control units.

Referring to FIG. 6, the operation of each axis control unit processed the sequence of management in the synchronous control management unit 11 is explained.

First, in case of an axis not handled as synchronous axis, this axis is an axis handled as spindle in ordinary speed control, or an axis handled as reference axis of synchronous control. Accordingly, the axis control unit checks if the corresponding spindle is handled as reference axis or synchronous axis of synchronous control (S11). In the case of the axis handled as ordinary speed control spindle (S11, No), the axis control unit issues the command speed to the corresponding spindle amplifier through the data input and output circuit 13 (S24). On the other hand, in case of reference axis (S11, Yes), the axis control unit checks if the spindle motor control system has been changed over from the speed control system to position control system or not (S12).

If not changed over to the position control system (S12, No), the control system of the spindle motor is changed over to the position control system (S13). On the other hand, if already changed over to the position control system (S12, Yes), the moving stroke per unit time is calculated from the speed command to the spindle, and the command position for position control is calculated (S14).

Consequently, the axis control unit checks if the corresponding axis is handled as synchronous axis of synchronous control or not (S15). In this case, it is not handled as synchronous axis, then it is checked if reference axis of synchronous control or not (S18). Herein, being explained as reference axis, the reference position moving stroke which is the moving stroke per unit time of axis is issued to the axis control unit of the axis to be synchronized (S19).

Again, checking if handled as synchronous axis of synchronous control or not (S20), since the reference axis is handled herein (S20, No), the axis command position is issued to the data input and output processing unit 13 (S23), and the spindle amplifier for controlling the reference axis controls the position of the spindle according to the commanded command position.

Next, the synchronous axis of synchronous control is explained. First, it is checked if the corresponding spindle is handled as reference axis or synchronous axis of synchronous control or not (S11). Being handled as synchronous axis herein (S11, Yes), the axis control unit checks if the control system of the spindle motor has been changed over from speed control system to position control system or not by the synchronous control (S12).

If not changed over to the position control system (S12, No), the control system of the spindle motor is changed over to the position control system (S13). On the other hand, if already changed over to the position control system (S12, Yes), the position moving stroke per unit time is calculated from the speed command to the spindle, and the command position for position control is calculated (S14).

Consequently, the axis control unit checks if handled as synchronous axis of synchronous control or not (S15). In this case, it is handled as synchronous axis (S15, Yes), and the axis control unit checks if the reference axis is changed over to the position control system to be in the synchronous control mode or not (S16). If the reference axis is not changed over to the synchronous control mode (S16, No), the process advances to step S18 in order that the command of synchronous axis may be the one calculated at step S14. On the other hand, when the reference axis has been changed over to the synchronous control mode (S16, Yes), the moving stroke per unit time of the axis synchronized with the reference position moving stroke issued from step S19 of the reference axis is calculated (S17) For example, assuming the position moving stroke per unit time of reference axis to be La, the rotation ratio to be reference axis rotation:synchronous axis rotation=Ra:Rb, the command unit time of reference axis to be Ia, and the command unit time of synchronous axis to be Ib, the position moving stroke per unit time of the synchronous axis is expressed in the following formula.

$$Lb = La \times (Rb/Ra) \times (Ib/Ia)$$

Next, the axis control unit further checks if the synchronous axis is the reference axis of synchronous control or not (S18) If the synchronous control is executed in one set (S18, No), this synchronous axis is not handled as reference axis, and the process goes to step S20. If the synchronous control is executed in two or more sets (S18, Yes), this synchronous axis can be a reference axis of other set. Therefore, in case of reference axis, the reference position moving stroke which is the moving stroke per unit time of the axis is issued to the axis control unit of the axis to be synchronized (S19). Again, checking if handled as synchronous axis of synchronous control (S20), since it is handled as synchronous axis of synchronous control (S20, Yes), the axis control unit calculates the position correction amount (S21), and further adds this position correction amount to the command position, and calculates the corrected command position (S22).

Finally, the axis control unit issues the command position of axis to the data input and output processing unit 13, and the spindle amplifier for controlling the synchronous axis controls the position of the spindle according to the commanded command position (S23).

The numerical control apparatus of the invention thereafter repeats the same operation according to the flowchart, and synchronously controls a plurality of sets by normal combination among arbitrary axes.

According to the numerical control apparatus of the invention, synchronous control is realized in two or more spindles in the machine tool, and synchronous control is simultaneously in three or more spindles, and the precision of synchronism is higher than in the prior art.

In the configuration of the invention, in spindle synchronous control on plural axes, unlike the prior art, it is not necessary to install plural numerical control apparatuses, so that the cost of the machine tool can be curtailed. As a result, the machine tool can be reduced in size.

Further, in the numerical control apparatus of the invention, since the synchronous position correction unit 76 of the axis control unit for controlling the synchronous axes corrects the deviation component occurring during synchronous control, off-synchronism component due to delay caused by cutting load or the like can be easily corrected, or even in case of synchronous control of axes involving difference always in the position deviation amount due to difference in position control gain or load, unjust torque due to correction does not take place, and synchronous control of high precision is realized. As a result, flaw or distortion of the work can be prevented, and processing of higher precision is possible.

Figure 7:
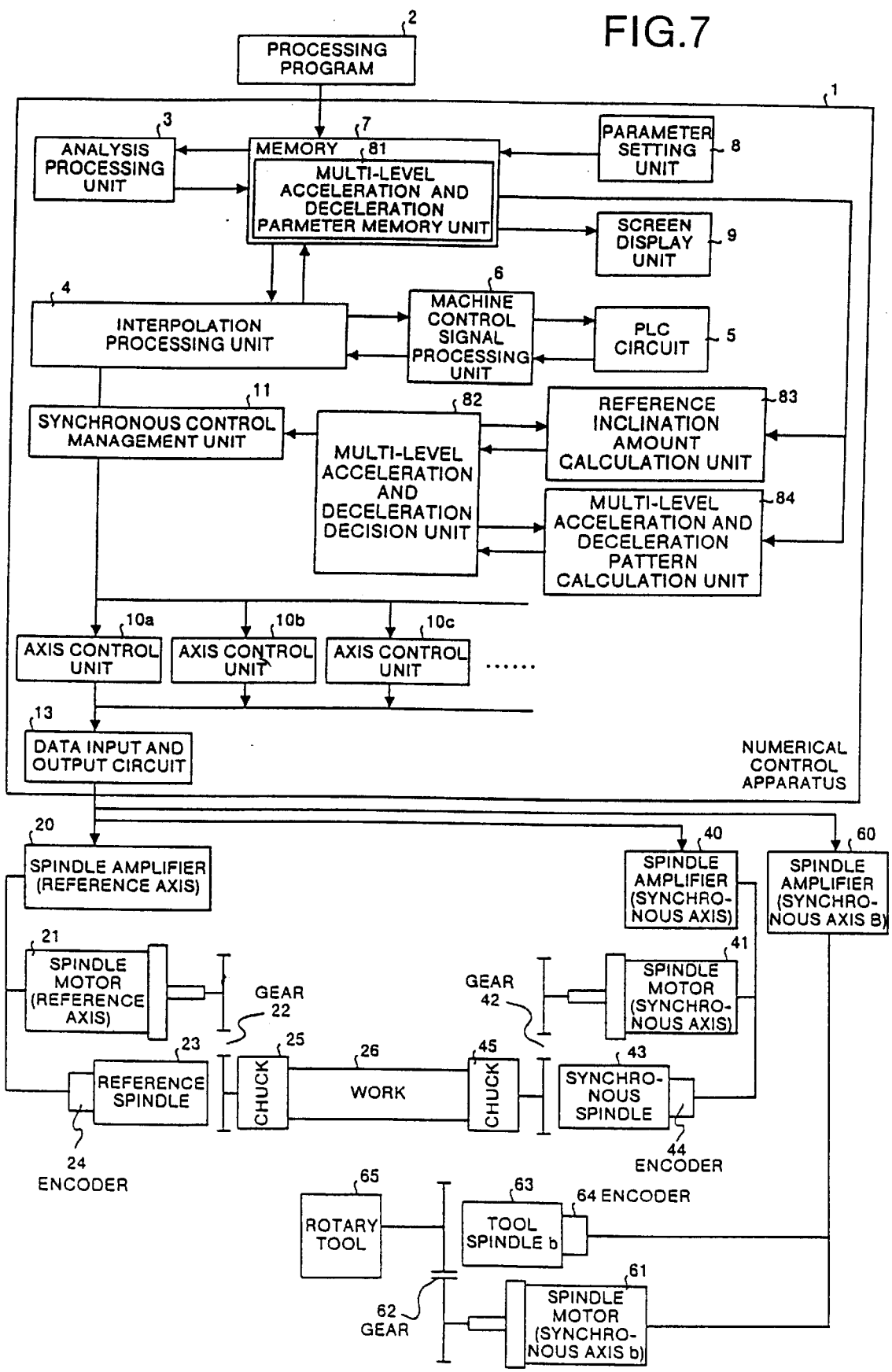
FIG. 7 shows configuration of a numerical control apparatus according to a second embodiment.

FIG. 7 is an essential block diagram of the numerical control apparatus according to the second embodiment. This numerical control apparatus, in addition to the components shown in FIG. 1, comprises a multi-level acceleration and deceleration parameter memory unit 81 for storing multi-level acceleration and deceleration speed, multi-level reference acceleration and deceleration time constant, and multi-level acceleration and deceleration time constant multiplying factor described below, generated according to the ordinary speed control acceleration and deceleration pattern, by manipulating the parameter setting screen, a reference inclination amount calculation unit 83 for calculating the reference inclination amount which is the acceleration and deceleration speed per unit time, from the maximum rotating speed and multi-level reference acceleration and deceleration time constant of reference spindle and synchronous spindle, a multi-level acceleration and deceleration pattern calculation unit 84 for calculating an optimum multi-level acceleration and deceleration pattern from the set multi-level acceleration and deceleration parameter, and a multi-level acceleration and deceleration decision unit 82 for determining the pattern of acceleration and deceleration pattern, and noticing the pattern to the synchronous control management unit. The components in the second embodiment which are same as those in the first embodiment are provided with the same reference characters, and their description is omitted.

The operation of the numerical control apparatus according to the second embodiment will be explained here.

Figure 9:
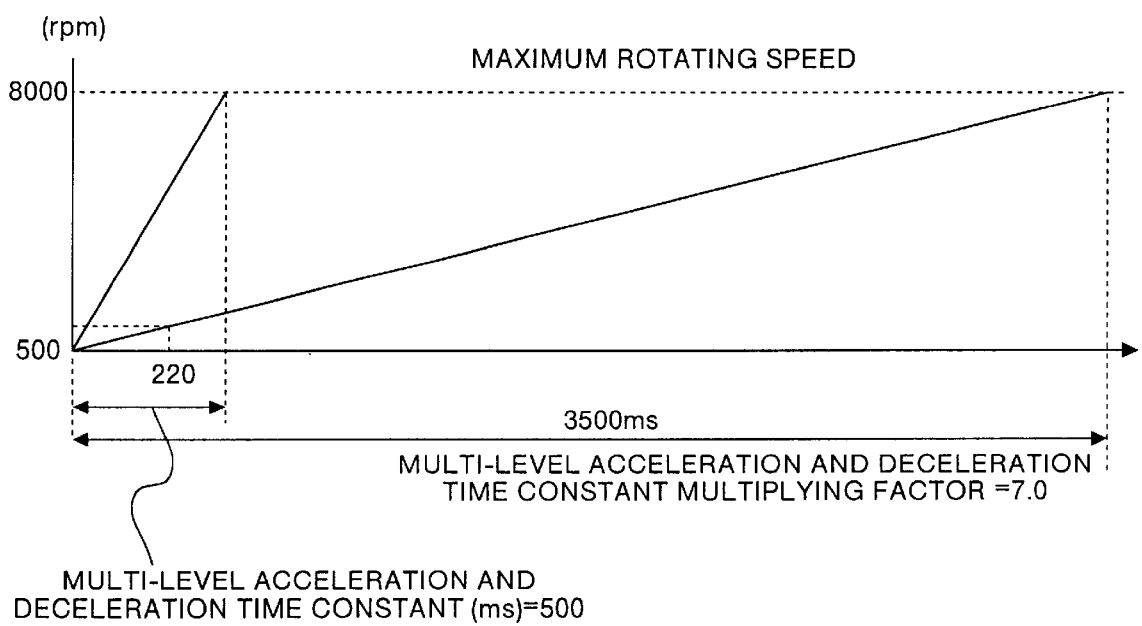
FIG. 9 is a diagram showing a method of calculation of multi-level acceleration and deceleration time constant multiplying factor.

First, setting of multi-level acceleration and deceleration parameter from acceleration and deceleration speed, multi-level reference acceleration and deceleration time constant, and multi-level acceleration and deceleration time constant multiplying factor is explained by referring to the essential block diagram in FIG. 7, a specific example of multi-level acceleration and deceleration pattern for synchronous control in FIG. 8, a diagram showing calculation method of multi-level acceleration and deceleration time constant multiplying factor in FIG. 9, and a setting example of multi-level acceleration and deceleration parameter for synchronous control in FIG. 10.

As shown in FIG. 8(a), usually, the spindle motor accelerates and decelerates according to the acceleration and deceleration pattern of speed control system, that is, along curve 1 shown in FIG. 8(a). However, the acceleration and deceleration pattern by speed control system is a pattern at the time of maximum torque output of spindle motor. Accordingly, in spindle synchronous control of two or more spindle motors, in order to accelerate and decelerate while maintaining the precision of synchronism, it is necessary to accelerate and decelerate with plural acceleration and deceleration patterns having a larger allowance (a smaller inclination) than the acceleration and deceleration pattern of speed control system, that is, by setting multi-level acceleration and deceleration pattern.

The reason of multi-level setting of acceleration and deceleration pattern is explained.

During high speed rotation, for example, at 7200 rpm to 8000 rpm in FIG. 8(a), the inclination of acceleration and deceleration is very moderate. The spindle synchronous acceleration and deceleration pattern ② in FIG. 8(a) must be set with a larger allowance than the acceleration and deceleration pattern of speed control due to the same reason as mentioned above, and if set in one stage, the acceleration and deceleration time becomes very long. Hence, by setting a multi-level acceleration and deceleration pattern, the acceleration and deceleration operation can be done efficiently in a short time form low speed rotation to high speed rotation of the spindle motor (that is, acceleration and deceleration closed to the acceleration and deceleration pattern of speed control can be realized).

The parameter of multi-level acceleration and deceleration pattern of spindle synchronous control is explained.

In FIG. 8(a), the acceleration and deceleration pattern of speed control up to maximum rotating speed of 8000 rpm is divided into seven sections. It is divided in a large section where the acceleration and deceleration pattern of speed control system can be approximately linearly, and in a small section where the curve is large. For example, in FIG. 8(a), the former corresponds to inclination 2, inclination 4, and inclination 7, and the latter corresponds to inclination 1, inclination 3, inclination 5, and inclination 6.

Determining the time constant at the largest inclination, it is defined as the time until reaching the maximum rotating speed, that is, the multi-level reference acceleration and deceleration time constant. In the example in FIG. 8(a), inclination 2 is the multi-level reference acceleration and deceleration time constant, and it is calculated to be about 500 ms in the following formula.

$$8000 \text{ (rpm)}/(4000 \text{ (rpm)}-500 \text{ (rpm)})\times220 \text{ (ms)}=503 \text{ (ms)}$$

Next, the multi-level acceleration and deceleration time constant multiplying factor is defined as the ratio to the multi-level acceleration and deceleration time constant, and each multi-level acceleration and deceleration time constant multiplying factor the multi-level acceleration and deceleration pattern is calculated as follows.

First, the method of determining the multi-level acceleration and deceleration time constant multiplying factor of inclination 1 is explained according to FIG. 9. For example, from FIG. 1, the inclination (multi-level acceleration and deceleration speed per unit time) is determined as follows:

$$500 \text{ (rpm)}/220 \text{ (ms)}=2.27 \text{ (rpm/ms)}$$

and the time to accelerate up to 8000 rpm is $$8000 \text{ (rpm)}/2.27 \text{ (rpm/ms)}=3520 \text{ (ms)}$$

Finally, the ratio to the multi-level reference acceleration and deceleration time constant (multi-level acceleration and deceleration time constant multiplying factor) is calculated as follows:

$$3520 \text{ (ms)}/500 \text{ (ms)}=7 \text{ (times)}$$

and hence the multi-level acceleration and deceleration time constant multiplying factor 1 of inclination 1 is 7.

Similarly, the multi-level acceleration and deceleration time constant multiplying factor 3, multi-level acceleration and deceleration time constant multiplying factor 4, multi-level acceleration and deceleration time constant multiplying factor 5, multi-level acceleration and deceleration time constant multiplying factor 6, and multi-level acceleration and deceleration time constant multiplying factor 7 of inclination 3, inclination 4, inclination 5, inclination 6, and inclination 7 are calculated, and the parameters as shown in FIG. 10(a) are obtained. In FIGS. 8(b), (c), and (d), each multi-level acceleration and deceleration time constant multiplying factor is calculated, and patterns as shown in FIGS. 10(b), (c), and (d) are obtained. Herein, since the acceleration and deceleration pattern of the largest inclination is defined as the multi-level reference acceleration and deceleration time constant, the inclination is moderate in other acceleration and deceleration patterns (that is, the multi-level acceleration and deceleration time constant multiplying factor is larger than 1).

The parameters shown in FIG. 10 are stored in the multi-level acceleration and deceleration parameter memory unit 81 in FIG. 7 through the parameter setting screen 8 by manipulating the parameter setting screen not shown in the drawing.

Figure 11:
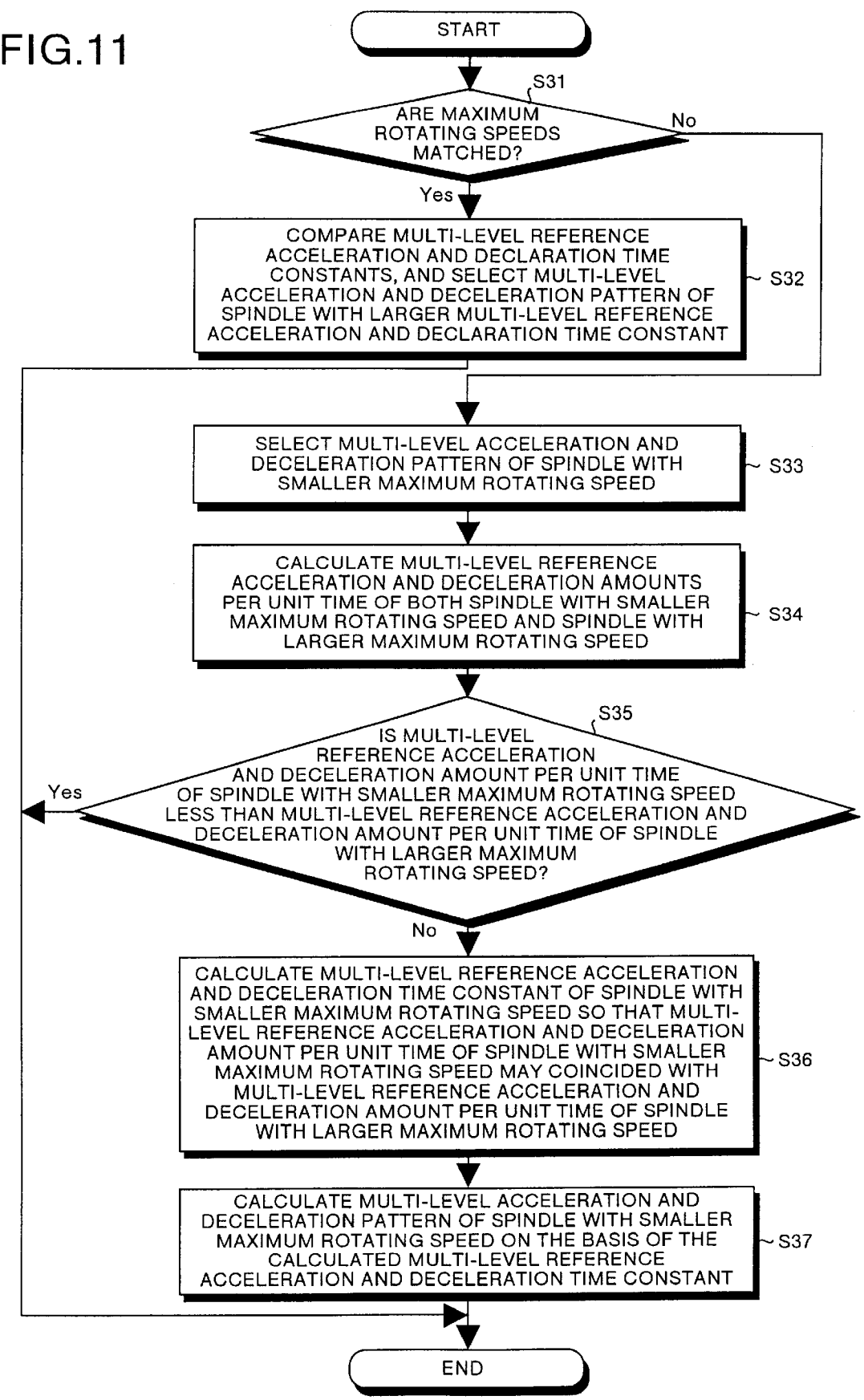
FIG. 11 shows a method of selection and calculation of multi-level acceleration and deceleration pattern.
Figure 12:
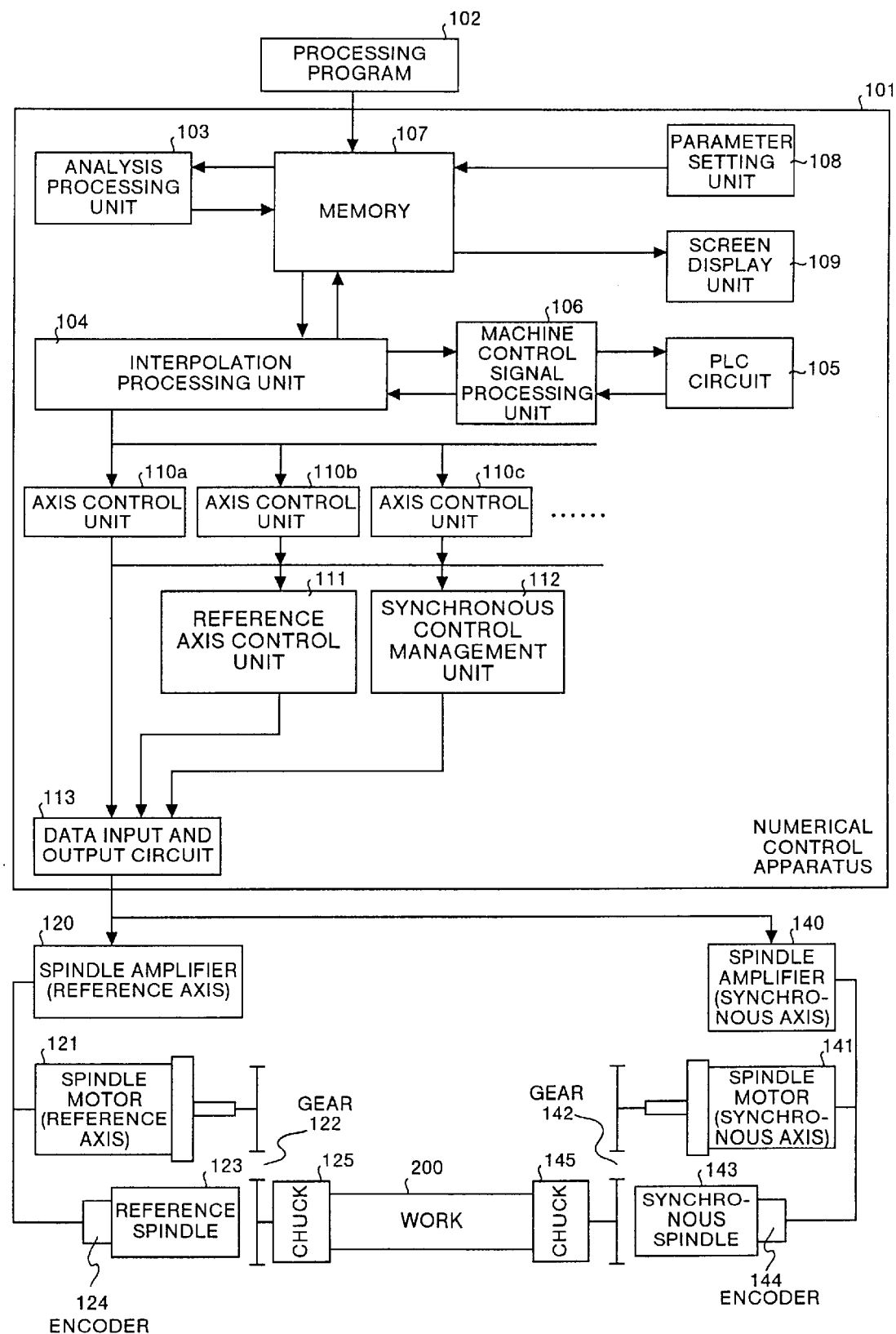
FIG. 12 shows a configuration of a conventional numerical control apparatus.

FIG. 11 is a flowchart showing the method of selection and calculation of multi-level acceleration and deceleration pattern.

The selection method of multi-level acceleration and deceleration pattern of synchronous control of three or more spindles is explained by referring to FIG. 7, FIG. 8, FIG. 9, FIG. 10, and FIG. 11.

The acceleration and deceleration pattern in FIG. 8(a) shows an acceleration and deceleration pattern of synchronous control of reference spindle 23 and synchronous spindle 43. Herein, suppose the synchronous spindle b63 is further synchronized with the spindle synchronism of reference spindle 23 and synchronous spindle 43. As the acceleration and deceleration pattern of synchronous spindle b63, three types are assumed as shown in the diagram. In a first type, the maximum rotating speed of the synchronous spindle b63 is same as the maximum rotating speed of reference spindle 23 and synchronous spindle 43 (FIG. 8(b)), in a second type, the maximum rotating speed of the synchronous spindle b63 is different from that of the reference spindle 23 and synchronous spindle 43, and the multi-level reference acceleration and deceleration time constant (the time until reaching the maximum rotating speed) of the synchronous spindle b63 is smaller than that of the reference spindle 23 and synchronous spindle 43 (FIG. 8(c)), and in a third type, the maximum rotating speed of the synchronous spindle b63 is different from that of the reference spindle 23 and synchronous spindle 43, and the multi-level reference acceleration and deceleration time constant of the synchronous spindle b43 is larger than that of the reference spindle 23 and synchronous spindle 43.

When three spindles, reference spindle 23, synchronous spindle 43, and synchronous spindle b63, start spindle synchronism, the multi-level acceleration and deceleration decision unit 82 compares, for example, the maximum rotating speed of the reference spindle 23 and synchronous spindle 43 and the maximum rotating speed of the synchronous spindle b63 (S31). At this time, when the maximum rotating speed of the reference spindle 23 and synchronous spindle 43 and the maximum rotating speed of the synchronous spindle b63 are matched (S31, Yes), the multi-level acceleration and deceleration decision unit 82 compares the multi-level acceleration and deceleration time constants of the reference spindle 23, synchronous spindle 43, and synchronous spindle b63, and selects the multi-level acceleration and deceleration pattern of the largest multi-level reference acceleration and deceleration time constant, and notices the selected multi-level acceleration and deceleration pattern to the synchronous control management unit 11 (S32). Referring to the example in FIG. 8, the reference spindle and synchronous spindle of (a) and synchronous spindle b(1) of (b) correspond thereto, and the multi-level reference acceleration and deceleration time constant of the reference spindle and synchronous spindle of FIG. 8(a) is 500 ms, and the multi-level reference acceleration and deceleration time constant of FIG. 8(b) is 600 ms. Therefore, in the multi-level acceleration and deceleration decision unit 82, comparing the both multi-level reference acceleration and deceleration time constants, the multi-level acceleration and deceleration pattern of synchronous spindle b(1) of FIG. 8(b) having the larger multi-level reference acceleration and deceleration time constant is selected, and the selected multi-level acceleration and deceleration pattern is noticed to the synchronous control management unit 11 (S32).

On the other hand, when the maximum rotating speed of the reference spindle 23 and synchronous spindle 43 and the maximum rotating speed of the reference spindle b63 are not matched, the multi-level acceleration and deceleration decision unit 82 compares the maximum rotating speed of the reference spindle 23 and synchronous spindle 43 and the maximum rotating speed of the reference spindle b63, and selects the acceleration and deceleration pattern of the spindle having the smaller maximum rotating speed (S33). At this time, the multi-level acceleration and deceleration decision unit 82 requests calculation of reference inclination amount to the reference inclination amount calculation unit 83. Herein, the reference inclination amount is the multi-level acceleration and deceleration speed per unit time.

Being requested from the multi-level acceleration and deceleration decision unit 82, the reference inclination amount calculation unit 83 calculates the reference inclination amount as follows from the maximum rotating speed of the designated spindle and the multi-level reference acceleration and deceleration time constant (S34).

Reference inclination amount=maximum rotating speed/multi-level reference acceleration and deceleration time constant The reference inclination amount calculation unit 83 notices the result of calculation to the multi-level acceleration and deceleration decision unit 82.

Receiving the calculation result from the reference inclination amount calculation unit 83, the multi-level acceleration and deceleration decision unit 802 checks if the reference inclination amount of the spindle of the smaller maximum rotating speed is less than the reference inclination amount of the spindle of the larger maximum rotating speed or not (S35). At this time, if the reference inclination amount of the spindle of the smaller maximum rotating speed is less than the reference inclination amount of the spindle of the larger maximum rotating speed (S35, Yes), the multi-level acceleration and deceleration decision unit 82 notices the acceleration and deceleration pattern selected at step S33 directly to the synchronous control management unit 11. Referring to the example in FIG. 8, the reference spindle and synchronous spindle of (a) and the synchronous spindle b(2) of (c) correspond thereto. Comparing the maximum rotating speed between (a) 1 and (c) in FIG. 8, (a) is 8000 rpm, and (c) is 4000 rpm, and the maximum rotating speed of (c) is smaller, and hence the acceleration and deceleration pattern of synchronous spindle b(2) of (c) is selected.

The reference inclination amount becomes, according to FIG. 8(a), 8000 (rpm)/500 (ms)=16 (rpm/ms)

and becomes, according to FIG. 8(c), 4000 (rpm)/400 (ms)=10 (rpm/ms).

Comparing the two, as shown below, since the reference inclination amount of the synchronous spindle b(2) with smaller maximum rotating speed is less than the reference inclination amount of the reference spindle and synchronous speed with larger maximum rotating speed, 10 (rpm/ms)<16 (rpm/ms)

the multi-level acceleration and deceleration decision unit 82 selects the acceleration and deceleration pattern of the synchronous spindle b(2) with smaller maximum rotating speed.

On the other hand, when the reference inclination amount of the spindle of the smaller maximum rotating speed is more than the reference inclination amount of the spindle of the larger maximum rotating speed (S35, No), the multi-level acceleration and deceleration decision unit 82 requests calculation of multi-level acceleration and deceleration pattern to the multi-level acceleration and deceleration pattern calculation unit 84. Being requested from the multi-level acceleration and deceleration decision unit 82, the multi-level acceleration and deceleration pattern calculation unit 84 calculates the multi-level reference acceleration and deceleration time constant from the reference inclination amount of reference spindle and synchronous spindle and reference inclination amount of synchronous spindle b(2) calculated by the reference inclination amount calculation unit 83 (S36).

Using the multi-level reference acceleration and deceleration time constant calculated in the multi-level acceleration and deceleration pattern calculation unit 84, and the multi-level acceleration and deceleration parameter shown in FIG. 10, the multi-level acceleration and deceleration pattern is calculated (S37), and noticed to the multi-level acceleration and deceleration decision unit 82. The multi-level acceleration and deceleration decision unit 82 notices the multi-level acceleration and deceleration pattern calculated in the multi-level acceleration and deceleration pattern calculation unit 84 to the synchronous control management unit 11. Referring to the example in FIG. 8, the reference spindle and synchronous spindle of (a) and the synchronous spindle b(3) of (d) correspond thereto.

Calculating the reference inclination amount, in (a), 8000 (rpm)/500 (ms)=16 (rpm/ms)

and in (d), 6000 (rpm)/300 (ms)=20 (rpm/ms)

Comparing the two, 16 (rpm/ms)<20 (rpm/ms)

since the synchronous spindle b(3) with smaller maximum rotating speed is larger in the reference inclination amount, the multi-level acceleration and deceleration pattern calculation unit 84 calculates the multi-level reference acceleration and deceleration time constant from the reference inclination amount of reference spindle and synchronous spindle, and the reference inclination amount of synchronous spindle b(2) calculated in the reference inclination amount calculation unit 803. The result is as follows.

300 (ms)×20 (rpm/ms)/16 (rpm/ms)=375 (ms)

On the basis of this result of calculation, the multi-level acceleration and deceleration pattern calculation unit 84 calculates the multi-level acceleration and deceleration pattern by using the multi-level acceleration and deceleration parameter shown in FIG. 10(*d*). Results of calculation are as follows.

| Spindle rotating speed (rpm) | Acceleration and deceleration pattern (inclination: rpm/ms) |
|---|---|
| 0–450 | 6000/(375 × 6.8) = 2.35 |
| 450–3000 | 6000/(375 × 1.0) = 16 |
| 3000–3500 | 6000/(375 × 4.6) = 3.48 |
| 3500–4500 | 6000/(375 × 5.0) = 3.2 |
| 4500–4900 | 6000/(375 × 7.1) = 2.25 |
| 4900–5400 | 6000/(375 × 7.5) = 2.13 |
| 5400–6000 | 6000/(375 × 15.0) = 1.07 |

The multi-level acceleration and deceleration pattern calculation unit 84 notices the calculation results to the multi-level acceleration and deceleration decision unit 82. The multi-level acceleration and deceleration decision unit 82 notices the multi-level acceleration and deceleration pattern calculated in the multi-level acceleration and deceleration pattern calculation unit 84 to the synchronous control management unit 11.

Thus, according to the numerical control apparatus of the invention, an appropriate acceleration and deceleration pattern may be always noticed to the synchronous control management unit 11.

Industrial Applicability

As described herein, the numerical control apparatus of the invention is useful in a machine tool for synchronous control by driving two or more spindle motors or servomotors, and is particularly suited to synchronous control of higher precision.

What is claimed is:

1. A numerical control apparatus for synchronously controlling a plurality of spindle motors or servo motors, driven by a machine tool according to a processing program, the numerical control apparatus comprising:

a memory unit which stores the processing program;

a synchronous control management unit which manages a dominant relation of a plurality of axes to be controlled synchronously; and a plurality of axis control units, having information about a reference axis as a reference of synchronous control or having information about a synchronous axis for operating synchronously with the reference axis stored according to the dominant relation of the axes managed by the synchronous control management unit, for controlling the corresponding spindle motors or servo motors on the basis of a calculated command position, wherein one of said axis control units having set the information about the reference axis, and the other axis control units having set the information about the synchronous axis, control the corresponding plurality of spindle motors or servo motors, and the plurality of axes can be controlled synchronously in relation to the reference axis.

2. The numerical control apparatus according to claim 1, wherein each of the plural axis control units includes:

an axis control system changeover unit for changing over to either a speed control system for driving the corresponding motor depending on a speed command value described in the processing program or a position control system for driving depending on a moving stroke per unit time converted from the speed command value;

an axis control command converting unit for calculating the moving stroke per unit time from the speed command value with respect to the reference axis;

a reference position output for issuing the moving stroke per unit time of the reference axis, calculated in the axis control command value converting unit, to another axis control unit, a reference position input unit for receiving the moving stroke per unit time of the reference axis calculated in another axis control unit; and a synchronous position calculation processing unit for calculating the command position corresponding to the pertinent axis, on the basis of the moving stroke per unit time calculated by the axis control command value converting unit or the moving stroke received in the reference position input unit, wherein, in the position control system, when controlling the reference axis, the synchronous position calculation processing unit adds the moving stroke of the reference axis calculated in the axis control command converting unit to a reference position of the reference axis, and calculates the command position of the reference axis, and when controlling the synchronous axis, the synchronous position calculation processing unit calculates the moving stroke per unit time of the synchronous axis, based on the moving stroke per unit time received in the reference position input unit, a gear ratio of the synchronous axis to the reference axis, command rotation ratio, and command unit time ratio, and adds the moving stroke per unit time to a reference position of the synchronous axis, thereby calculating the command position of the synchronous axis.

3. The numerical control apparatus according to claim 2, wherein the axis control system changeover unit of the axis control unit which controls the synchronous axis calculates a theoretical command position by subtracting the speed command value described in the processing program, a theoretical value of position deviation amount calculated from a position control gain of the motor, and a delay amount corresponding to a sampling delay time of feedback position, from the feedback position of the axis, and changes over from an ordinary speed control system to the position control system in a contracted state of fluctuation of the position deviation amount.

4. The numerical control apparatus according to claim 1, wherein each of the axis control units further comprises a synchronous position correction unit for correcting a fluctuation of the axis by calculating a position correction amount from a position deviation amount of the reference axis and a position deviation amount of the synchronous axis, and adding the position correction amount to the command position of the synchronous axis.

5. The numerical control apparatus according to claim 4, wherein the synchronous position correction unit in the axis control unit for controlling the synchronous axis multiplies the position deviation amount of the reference axis by a command rotation ratio of the reference axis and the synchronous axis, and a command unit time ratio, and calculates a difference between a calculation result and the position deviation amount of the reference axis, then determines a value of passing the obtained difference through the primary delay filter according to a specific time constant determined by a parameter as the position correction amount.

6. The numerical control apparatus according to claim 4, wherein each of axis control units includes a theoretical position deviation amount calculation processing unit for calculating a theoretical position deviation amount from a speed control value described in the processing program and the position control gain of the corresponding motor, wherein, the synchronization position correction unit in the axis control unit for controlling the synchronous axis calculates a difference between the theoretical position deviation amount of the reference axis calculated in the theoretical position deviation amount calculation processing unit and an actual position deviation amount obtained from the reference axis, and determines a value calculated from the difference, a command rotation ratio of the synchronous axis to the reference axis, and a command unit time ratio, as the position correction amount.

7. The numerical control apparatus according to claim 4, wherein each one of the axis control units includes a synchronous correction amount fixing unit for calculating an average of the position deviation amount in steady rotation on the reference axis and the synchronous axis for synchronous control, and further calculates their difference, wherein, the synchronous position correction unit in the axis control unit for controlling the synchronous axis determines a difference calculated in the synchronous correction amount fixing unit as the position correction amount.

8. The numerical control apparatus according to claim 4, wherein the memory unit incorporates a synchronous correction coefficient holding unit for calculating an average of the position deviation amount in steady rotation on the reference axis and the synchronous axis for synchronous control, at a time of initial adjustment of the machine tool, and holds a value obtained by dividing this average by the speed control value as a coefficient for obtaining the position deviation amount, wherein, the synchronous position correction unit in the axis control unit for controlling the synchronous axis calculates the average of the position deviation amount in steady rotation on the reference axis and the synchronous axis for synchronous control, by applying the speed command value by the coefficient held in the synchronous correction coefficient holding unit and obtains this difference as the position correction amount.

9. The numerical control apparatus according to claim 1, further comprising a synchronous correction amount error canceling unit for canceling a variation component of the position deviation amount caused by a variation due to disturbance, by subtracting a difference between the average of the position deviation amount in steady rotation on the synchronous axis for synchronous control and an actual position deviation amount, temporarily from the position correction amount.

10. The numerical control apparatus according to claim 1, further comprising:

a multi-level acceleration and deceleration parameter memory unit for storing a multi-level acceleration and deceleration speed generated by the acceleration and deceleration pattern of an ordinary speed control system, a multi-level reference acceleration and deceleration time constant, and a multi-level acceleration and deceleration time constant multiplying factor by manipulating a parameter setting screen;

a reference inclination amount calculation unit for calculating a reference inclination amount, as an acceleration and deceleration speed per unit time, from a maximum rotating speed and the multi-level reference acceleration and deceleration time constant of the reference axis and synchronous axis;

a multi-level acceleration and deceleration pattern calculation unit for calculating an appropriate multi-level acceleration and deceleration pattern from the set multi-level acceleration and deceleration pattern; and a multi-level acceleration and deceleration decision unit for determining the multi-level acceleration and deceleration pattern to be noticed to the synchronous control management unit.

* * * * *